(12) United States Patent
Yokoyama et al.

(10) Patent No.: US 8,293,162 B2
(45) Date of Patent: Oct. 23, 2012

(54) METHOD AND APPARATUS FOR PRODUCING MOLDED PRODUCT

(75) Inventors: Hiroshi Yokoyama, Tokyo (JP);
Hiroshige Okamoto, Tokyo (JP);
Muneaki Aminaka, Tokyo (JP); Kouji Takeuchi, Tokyo (JP); Hironobu Yamauchi, Tokyo (JP); Ken Someya, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 224 days.

(21) Appl. No.: 11/791,771

(22) PCT Filed: Nov. 29, 2005

(86) PCT No.: PCT/JP2005/021897
§ 371 (c)(1),
(2), (4) Date: May 29, 2007

(87) PCT Pub. No.: WO2006/059608
PCT Pub. Date: Jun. 8, 2006

(65) Prior Publication Data
US 2008/0128949 A1   Jun. 5, 2008

(30) Foreign Application Priority Data

Nov. 30, 2004 (JP) ................. 2004-345243
Nov. 30, 2004 (JP) ................. 2004-345244
Nov. 30, 2004 (JP) ................. 2004-345245
Dec. 13, 2004 (JP) ................. 2004-359340
Aug. 16, 2005 (JP) ................. 2005-235816

(51) Int. Cl.
*B29B 7/00*   (2006.01)
*B29C 45/76*  (2006.01)
*B28B 17/00*  (2006.01)
*G01N 21/00*  (2006.01)

(52) U.S. Cl. ............ 264/328.1; 264/40.1; 264/40.7; 264/297.2; 264/297.8; 264/328.8; 264/328.17; 526/67; 425/135; 425/145; 425/149; 425/376.1; 425/382 R; 425/560; 425/562; 425/563; 425/588; 422/131

(58) Field of Classification Search ............... 264/40.1, 264/319, 328.1, 328.8, 40.7, 297.2, 297.8, 264/328.17; 526/67; 425/135, 145, 149, 425/376.1, 382 R, 560, 562, 563, 588; 422/131
See application file for complete search history.

(56) References Cited

U.S. PATENT DOCUMENTS
3,353,209 A * 11/1967 Schad .................... 425/145
(Continued)

FOREIGN PATENT DOCUMENTS
CN    1199651 A    11/1998
(Continued)

OTHER PUBLICATIONS
International Search Report for PCT/JP2005/021897, mailed Feb. 14, 2006.
(Continued)

*Primary Examiner* — Christina Johnson
*Assistant Examiner* — Atul P Khare
(74) *Attorney, Agent, or Firm* — Staas & Halsey LLP

(57) ABSTRACT

A method for producing a molded product consisting of a resin polymerized by a melt polycondensation reaction, comprising continuous feeding of a prepolymer in molten state from a prepolymer feeding port to a polymerization reactor, discharging from holes of a porous plate, followed by polymerization while dropping along a supporting substrate under reduced pressure, and molding by transferring to at least one molding machine in molten state without solidification, wherein transfer pressure to said molding machine is controlled so as to maintain at an arbitrary pressure from 0.1 to 100 MPa (absolute pressure).

11 Claims, 11 Drawing Sheets

U.S. PATENT DOCUMENTS

| | | | |
|---|---|---|---|
| 3,745,200 A * | 7/1973 | Geyer | 264/37.26 |
| 4,744,957 A | 5/1988 | Imai et al. | |
| 5,269,348 A * | 12/1993 | Schnaus et al. | 137/883 |
| 5,589,564 A * | 12/1996 | Komiya et al. | 528/196 |
| 5,597,891 A | 1/1997 | Nelson et al. | |
| 5,656,221 A | 8/1997 | Schumann et al. | |
| 5,656,719 A | 8/1997 | Stibal et al. | |
| 5,928,596 A | 7/1999 | McLeod et al. | |
| 5,945,460 A | 8/1999 | Ekart et al. | |
| 5,968,429 A * | 10/1999 | Treece et al. | 264/102 |
| 5,980,797 A | 11/1999 | Shelby et al. | |
| 6,099,778 A | 8/2000 | Nelson et al. | |
| 6,265,526 B1 * | 7/2001 | Komiya et al. | 528/196 |
| 6,346,070 B1 | 2/2002 | Ohmatsuzawa et al. | |
| 6,392,005 B1 | 5/2002 | Jen | |
| 6,656,577 B1 | 12/2003 | Adelman et al. | |
| 2002/0198331 A1 | 12/2002 | Nishihara et al. | |
| 2003/0176636 A1 | 9/2003 | Liesenfelder et al. | |
| 2005/0029712 A1 | 2/2005 | Nahill et al. | |
| 2005/0161863 A1 * | 7/2005 | Otto et al. | 264/328.1 |
| 2006/0121222 A1 | 6/2006 | Andrich et al. | |

FOREIGN PATENT DOCUMENTS

| | | |
|---|---|---|
| DE | 10356298 | 12/2004 |
| EP | 1671999 | 6/2006 |
| EP | 1 829 912 | 9/2007 |
| JP | 48-8355 | 3/1973 |
| JP | 53-17569 | 2/1978 |
| JP | 3-243316 | 10/1991 |
| JP | 8-231704 | 9/1996 |
| JP | 8-231843 | 9/1996 |
| JP | 8-231844 | 9/1996 |
| JP | 9-221540 | 8/1997 |
| JP | 11-508836 | 8/1999 |
| JP | 11-511187 | 9/1999 |
| JP | 2000-17162 | 1/2000 |
| JP | 2000-117819 | 4/2000 |
| JP | 2000-506199 | 5/2000 |
| JP | 2001-233948 | 8/2001 |
| JP | 2001-516297 | 9/2001 |
| JP | 2001-516389 | 9/2001 |
| JP | 2001-517164 | 10/2001 |
| JP | 2002-514239 | 5/2002 |
| JP | 2002-220443 | 8/2002 |
| JP | 3345250 | 8/2002 |
| JP | 2003-327812 | 11/2003 |
| JP | 2004-224895 | 8/2004 |
| JP | 2004-225008 | 8/2004 |
| JP | 2004-263195 | 9/2004 |
| JP | 2004-285332 | 10/2004 |
| JP | 2005-171081 | 6/2005 |
| JP | 2005-193379 | 7/2005 |
| TW | 200424231 | 11/2004 |
| WO | 97/31968 | 4/1997 |
| WO | 98/41559 | 9/1998 |
| WO | 99/65970 | 12/1999 |
| WO | 01/77188 | 10/2001 |
| WO | 2004/024577 | 3/2004 |
| WO | 2005/035620 | 4/2005 |

OTHER PUBLICATIONS

Encyclopedia of Chemistry, v.4, 1995, p. 7.
Bolshaya Sovetskaya Encyclopedia, v. 19, 1975, p. 641.
Office Action issued in corresponding Russian Patent Application No. 2007120066.
Office Action issued Sep. 30, 2008 in corresponding Taiwanese Patent Application No. 094141947.
U.S. Office Action mailed Feb. 17, 2010 in related U.S. Appl. No. 11/665,173.
U.S. Office Action for related U.S. Appl. No. 11/665,173, mailed on Nov. 22, 2010.
U.S. Advisory Action for related U.S. Appl. No. 11/665,173, mailed on May 4, 2011.
Office Action issued in related U.S. Appl. No. 11/665,173, mailed on Jun. 14, 2010.
Office Action issued in related Malaysian Patent Application No. PI 20055566, mailed on Oct. 24, 2008.
Database WPI, Week 200209, Thomson Scientific, AN 2002-0640465, XP002662891, Aug. 28, 2001, 1 page.
Supplemental European Search Report for corresponding European Patent Application No. 05 81 1460, issued on Jun. 21, 2012.
Database WPI, Week 200209, Thomson Scientific, AN 2002-064045, XP002662891, Aug. 28, 2001, 1 page.
Database WPI, Week 200473, Thomson Scientific, AN 2004-739986, XP002662892, Oct. 14, 2004, 3 pages.
Database WPI, Week 200311, Thomson Scientific, AN 2003-114570, XP002662893, Aug. 9, 2002, 3 pages.
Database WPI, Week 199744, Thomson Scientific, AN 1997-475502, XP002662894, Aug. 26, 1997, 2 pages.

* cited by examiner

METHOD AND APPARATUS FOR PRODUCING MOLDED PRODUCT

CROSS REFERENCE TO RELATED APPLICATIONS

This application is based on and claims priority benefit to Japanese Application Nos. 2004-345243, filed on Nov. 30, 2004, 2004-345244, filed on Nov. 30, 2004, 2004-345245, filed on Nov. 30, 2004, 2004-359340, filed Dec. 13, 2004, and 2005-235816, filed Aug. 16, 2005 and PCT Application No. PCT/JP2005/021897 filed on Nov. 29, 2005, the disclosures of which are hereby incorporated herein by reference.

TECHNICAL FIELD

The present invention relates to a method for producing a molded product consisting of a resin polymerized by a melt polycondensation reaction.

BACKGROUND ART

Various polycondensation polymers represented by a polyester resin such as polyethylene terephthalate (hereinafter abbreviated as "PET") have been noticed as having characteristics such as superior heat resistance and mechanical properties and also recently as environmentally friendly recyclable material and has widely been used as fibers, magnetic tapes, packaging films, sheets or injection molded products in various applications or preform for producing beverage containers.

A hollow product produced by blow molding of preform, in particular, has superior characteristics of such as light weight, impact resistance and transparency, along with recyclability, by which demand as containers for various beverage such as carbonated drink or juice, tea and mineral water, or liquid seasoning such as soy sauce, sauce and salad oil, cosmetic and liquid detergent has rapidly increased and such market will be expected to expand further in the future.

These containers require not only to have superior strength, impact resistance and transparency but also not to affect taste of contents. Therefore, as a polycondensation polymer used, high degree of polymerization, no coloring and high quality with low content of impurity generated by thermal decomposition such as acetaldehyde, are required. Furthermore, such a polycondensation polymer is strongly required to be produced industrially stably, in good productivity and in low cost.

In case of a hollow product made of a PET resin, preform is produced by injection molding of resin pellets prepared by solid phase polymerization yielding low coloring and small acetaldehyde content, however, recently as a low cost production method, such a method has been proposed for producing preform by transferring a PET resin produced by continuously melt polymerization into a preform molding machine in molten state as it is (see, for example, patent documents 1 to 16).

To produce a molded product with stable quality, it is necessary to adjust quality and amount of a molten resin transferred to a molding machine at constant level. However, methods proposed up to now are not easy to stably maintain quality of a molded product, because a polycondensation resin represented by a PET resin causes a thermal decomposition reaction in a long period of residence as molten state, which results in lower quality problems such as, depending on residence time, accumulation of a decomposed product such as acetaldehyde, decrease in molecular weight and coloring. In addition to the above, molecular weight may decrease during transferring a resin discharged from a polymerization reactor to a molding machine, which may result in variation of melt viscosity and thus transferring amount. The transferring amount to the molding machine may also be changed due to variation of melt viscosity of a resin discharged from the polymerization reactor by change in polymerization system before that.

Methods conventionally proposed have also difficulty in matching "resin producing rate" in a melt polymerization reactor and "resin molding rate" in a molding machine. For example, when a molding machine breaks down or a molding machine is stopped due to cleaning of an oligomer, and the like adhered to a mold, "resin molding rate" in a molding machine is below "resin producing rate" in a melt polymerization reactor. On the contrary, "resin producing rate" in the melt polymerization reactor may be below "resin molding rate" in the molding machine when the reaction is stalled in a polymerization system. As described above, mutual variation of "resin producing rate" and "resin molding rate" results in variation of resin quality due to change in melt resin residence time at the upper stream than the molding machine.

Furthermore, an injection molding machine such as a preform molding machine has a problem that flow of a molten resin received from the melt polymerization reactor is intermittent due to repeated molding of resin metering and injection cycle which always causes variation of melt resin residence time.

Patent document 2 discloses a compensation method for the intermittent flow in an injection molding machine by opening a feed port of a molding machine at specified sequence to substantially make material flow constant during molding using multiple molding machines in practicing a method for producing the above-described molded product, however, this patent document does not envision variation of quality or melt viscosity of a resin fed to a molding machine. As described above, mutual variation of "resin producing rate" and "resin molding rate" results in variation of resin quality. This method also has a problem of generation of a large quantity of defective products or loss till molded product quality is stably recovered once failure generates, because complicated exchange system or sequence is required.

Patent documents 4, 6, 7, 9, 10 and 14 disclose a method for making aldehyde harmless, which is generated and accumulated in a resin during polymer melt residence in melt polymerization and till cooling and solidification after melt polymerization and transferring to a molding machine, by the addition of an acetaldehyde scavenger. However, it is not effective to a problem of decreasing in resin molecular weight, although useful as measures for acetaldehyde in case of variation of resin quality and transferring amount of a resin fed to a molding machine and also mutual variation of "resin producing rate" and "resin molding rate". Furthermore, there is also a problem of worsening resin hue by an acetaldehyde scavenger itself.

Even other patent documents among 1 to 16 have not proposed technology at all to eliminate variation of molded product quality in case of variation of quality and transferring amount of a resin fed to a molding machine and also mutual variation of "resin producing rate" and "resin molding rate".

[Patent Document 1] JP No. 3,345,250
[Patent Document 2] JP-A-11-508836
[Patent Document 3] JP-A-11-511187
[Patent Document 4] U.S. Pat. No. 5,656,221
[Patent Document 5] JP-A-2000-506199
[Patent Document 6] JP-A-2002-514239
[Patent Document 7] JP-A-2001-516297

[Patent Document 8] WO 98/41559
[Patent Document 9] JP-A-2001-516389
[Patent Document 10] JP-A-2001-517164
[Patent Document 11] JP-A-2000-117819
[Patent Document 12] WO 2004/24577
[Patent Document 13] US-A-2005-29712
[Patent Document 14] DE-A-10356298
[Patent Document 15] JP-A-2005-171081
[Patent Document 16] JP-A-2005-193379

DISCLOSURE OF INVENTION

The object of the present invention is to provide technology which can produce a molded product with stable quality and weight in time course. The technology is a method for producing a high quality molded product in low cost by transferring a resin continuously polymerized by a melt polycondensation reaction, which is easy to adjust quality and feed amount of a molten resin fed in a molding machine and also easy to adjust them even in case of mutual variation of "resin producing rate" and "resin molding rate" in molten state as it is.

We have extensively studied a way to solve the above-described problems and found that melt polycondensation is possible at low temperature never attained by conventionally known polymerization apparatus in a method for producing a molded product characterized by continuously polymerizing resin by a melt polycondensation reaction, transferring polymerized resin in molten state to at least one molding machine, and melt molding. Namely, by using the polymerization reactor based on novel principle, the prepolymer is continuously fed in molten state from a prepolymer feeding port to the polymerization reactor, discharging from the holes of a porous plate, followed by polymerization while dropping along a supporting substrate under reduced pressure.

As the result, due to small variation of quality and melt viscosity of a molten resin fed to a molding machine, feed amount and quality of a resin fed to a molding machine can be maintained constant by controlling the transfer pressure to a molding machine so as to maintain at an arbitrary pressure from 0.1 to 100 MPa (absolute pressure) and also melt residence time in resin transferring can be shortened by designing smaller volume of a transfer pipeline (diameter of a pipeline) for a molten resin. In accordance with the present invention, an intermittent flow problem in a molding machine can be dealt with, without complicated switching system or sequence and resin quality and feed amount can be adjusted also in using multiple molding machines.

Because, of execution possibility of melt polycondensation at low temperature, which provides small variation of quality and melt viscosity of a molten resin fed into a molding machine, resin quality and feed amount to multiple molding machines and/or pelletizers can stably be adjusted also by using a resin feed method to each of separate molding machine and/or pelletizer by installing at least two discharge pumps at the polymerization reactor of the present invention.

Furthermore, it was found that, by installing a transfer pump connected to a pelletizer and/or a discharge nozzle in addition to a molding machine at the bottom of said polymerization reactor or after the discharge pump of said polymerization reactor to control output of said transfer pump based on level detection at the bottom of the polymerization reactor, and thus to maintain polymer melt residence time constant at the bottom of the polymerization reactor, variation of polymer melt residence time at the bottom of the polymerization reactor can be avoided even in case of mutual variation of "resin producing rate" and "resin molding rate", and a molded product with stable quality and weight in time course can be produced.

Based on these findings, we have accomplished the present invention.

That is the present invention has the following aspects:

(1) A method for producing a molded product consisting of a resin polymerized by a melt polycondensation reaction, comprising continuous feeding of a prepolymer in molten state from a prepolymer feeding port to a polymerization reactor, discharging from holes of a porous plate, followed by polymerization while dropping along a supporting substrate under reduced pressure, and molding by transferring to at least one molding machine in molten state without solidification, wherein transfer pressure to said molding machine is controlled so as to maintain at an arbitrary pressure from 0.1 to 100 MPa (absolute pressure).

(2) A method for producing according to (1), wherein the transfer pressure to the molding machine is controlled so as to maintain at an arbitrary pressure from 0.1 to 100 MPa (absolute pressure) by controlling the output amount of a discharging pump of said polymerization reactor.

(3) A method for producing according to (1) wherein the transfer pressure to the molding machine is controlled so as to maintain at an arbitrary pressure from 0.1 to 100 MPa (absolute pressure) by means of (I) controlling the output amount of the discharge pump of said polymerization reactor to be 1.0 to 100 times feed amount of the prepolymer and by means of (II) returning a resin discharged from the discharge pump to the bottom of said polymerization reactor, consisting of a pipeline connected to the down stream side of the discharge pump of said polymerization reactor and the bottom of said polymerization reactor and a system for output pressure detection and opening degree control of a polymer return valve or a back pressure valve installed at said pipeline.

(4) A method for producing according to any one of (1) to (3), wherein a polymer is transferred to a pelletizer and/or a discharge nozzle so that polymer melt residence time at the bottom is controlled from 0.1 to 120 minutes by installing a transfer pump connected to the pelletizer and/or the discharge nozzle in addition to a molding machine at the bottom of said polymerization reactor or after the discharge pump of said polymerization reactor.

(5) A method for producing a molded product consisting of a resin polymerized by a melt polycondensation reaction, comprising continuous feeding of the prepolymer in molten state from the prepolymer feeding port to the polymerization reactor, discharging from the holes of the porous plate, polymerization while dropping along the supporting substrate under reduced pressure, discharging said resin from at least two discharge pumps of said polymerization reactor, followed by molding by transferring to at least two molding machines and/or pelletizers in molten state without solidification.

(6) A method for producing according to (5), wherein at least one molding machine and/or pelletizer are connected to each of the discharge pumps of said polymerization reactor.

(7) A method for producing according to any one of (1) to (6), wherein at least a part of a polycondensation polymer produced by said melt polycondensation reaction in the amount over the amount to be used in molding or pelletizing is returned for re-circulation to an arbitrary step among production steps for said polycondensation polymer.

(8) A method for producing a molded product according to any one of (1) to (7), wherein said prepolymer is reacted with a molecular weight regulator of an arbitrary amount in an arbitrary step before feeding to said polymerization reactor.

(9) A method for producing a molded product according to any one of (1) to (8), wherein said molded product is at least one kind selected from preform for bottle molding, films, sheets, containers and fibers.
(10) A method for producing according to any one of (1) to (9), wherein a resin polymerized by said melt polycondensation reaction is a polyester resin.
(11) Apparatus for producing a molded product consisting of a resin polymerized by a melt polycondensation reaction, comprising continuous feeding of the prepolymer in molten state from the prepolymer feeding port to the polymerization reactor, discharging from the holes of the porous plate, followed by polymerization while dropping along the supporting substrate under reduced pressure, and molding by transferring to at least one molding machine in molten state without solidification, wherein the transfer pressure to said molding machine is controlled so as to maintain at a pressure from 0.1 to 100 MPa (absolute pressure).
(12) Apparatus according to (11), wherein the transfer pressure to the molding machine is controlled so as to maintain at a pressure from 0.1 to 100 MPa (absolute pressure) by controlling the output amount of the discharging pump of said polymerization reactor.
(13) Apparatus according to (11), wherein the transfer pressure to the molding machine is controlled so as to maintain at a pressure from 0.1 to 100 MPa (absolute pressure) by means of (I) controlling the output amount of the discharge pump of said polymerization reactor to be 1.0 to 100 times feed amount of the prepolymer and by means of (II) returning a resin discharged from the discharge pump to the bottom of said polymerization reactor, consisting of a pipeline connected to the down stream side of the discharge pump of said polymerization reactor and the bottom of said polymerization reactor and the system for output pressure detection and opening degree control of a polymer return valve or the back pressure valve installed at said pipeline.
(14) Apparatus according to any one of (11) to (13), wherein a polymer is transferred to the pelletizer and/or the discharge nozzle so that polymer melt residence time is controlled from 0.1 to 120 minutes by installing the transfer pump connected to the pelletizer and/or the discharge nozzle in addition to the molding machine at the bottom of said polymerization reactor or after the discharge pump of said polymerization reactor.
(15) Apparatus for producing a molded product consisting of a resin polymerized by a melt polycondensation reaction, wherein the prepolymer is continuously fed in molten state from the prepolymer feeding port to the polymerization reactor, discharged from the holes of the porous plate, polymerized while being dropped along the supporting substrate under reduced pressure, and the resin is discharged from at least two discharge pumps of said polymerization reactor, subsequently molded by being transferred to at least two molding machines and/or pelletizers in molten state without solidification.

By using a method for production in accordance with the present invention, in a method for producing a high quality molded product in low cost by transferring a resin continuously polymerized by a melt polycondensation reaction in molten state as it is, it is easy to stably adjust quality and feed amount of a molten resin fed to a molding machine and also easy to adjust them even in case of mutual variation of "resin producing rate" and "resin molding rate" and a molded product with stable quality and weight in time course can be produced.

BEST MODE FOR CARRYING OUT THE INVENTION

Because the present invention uses the polymerization reactor based on novel principle, (A) principle of the polymerization method, (B) a polycondensation polymer, (C) the polymerization reactor, (D) the polymerization method and (E) the molding method are specifically explained below in this order.

(A) Principle of the Polymerization Method

A polymerization method in accordance with the present invention is such one as executed by feeding the prepolymer of a resin polymerizable by a melt polycondensation reaction, in molten state from the prepolymer feeding port to the polymerization reactor, discharging from the holes of the porous plate, and dropping by gravitational force along the supporting substrate under reduced pressure or in inert gas atmosphere under reduced pressure.

As described later, by satisfying suitable conditions on characteristics of prepolymer, structure of the polymerization reactor and the polymerization method, the prepolymer dropping along the supporting substrate can contain much quantity of foam and shows behavior of rolling downward in the polymerization reactor as foam circular-(mass-) like resin structure with progress of polymerization.

This result brings about dramatic increase in contact area between the resin and vapor phase stirring effect of resin and effective removal of the by-product of the polycondensation reaction (in case of PET, ethylene glycol) or impurity generating by thermal decomposition during polymerization (in case of PET, acetaldehyde) from the prepolymer.

Thus, a polymerization method in accordance with the present invention has advantages of dramatically higher polymerization rate compared with conventional melt polymerization technology and production of resin having very few residue of impurity and high quality at low temperature, which is never attained by conventionally known polymerization apparatus.

(B) A Polycondensation Polymer:

"A resin polymerizable by a melt polycondensation reaction" in the present invention means a polymer having such structure as at least one kind of a monomer with 2 or more condensable functional groups is bonded through said functional groups. The above-described monomer may be either one having said functional groups directly bonded to an aliphatic hydrocarbon group or one having said functional groups directly bonded to an aromatic hydrocarbon group.

Specific examples of polycondensation resins include polymers having bonded structure of an aliphatic hydrocarbon group through said functional groups, such as aliphatic polyesters, aliphatic polyamides and aliphatic polycarbonates; polymers having bonded structure of an aliphatic hydrocarbon group and an aromatic hydrocarbon group through said functional groups, such as aliphatic aromatic polyesters, aliphatic aromatic polyamides and aliphatic aromatic polycarbonates; and polymers having bonded structure of an aromatic hydrocarbon group through said functional groups, such as aromatic polyesters and aromatic polyamides.

The above-described polycondensation resins may be homopolymers or copolymers. They are also copolymers wherein different bonds such as ester bonds, amide bonds and carbonate bonds may present in random or block state. Specific examples of these copolymers include polyester carbonates and polyester amides.

"The prepolymer" means a polymer at initial polymerization stage with lower degree of polymerization compared with a product resin and may include an oligomer or a monomer and one preliminary polymerized to desired degree of polymerization using conventionally known apparatus such as a vertical type stirring polymerization reactor, a horizontal type stirring polymerization reactor with a mono axial or twin axial stirring blade, a natural flowing down type thin film polymerization reactor with plates, a thin film polymerization reactor with natural flowing down on inclined planes, a tubular polymerization reactor and a wetted-wall tower.

For example, the prepolymer of a polyester is produced by polycondensation of a compound having a hydroxyl group and a compound having a carboxyl group or a compound having a lower alcohol ester of a carboxyl group. The prepolymer of a polyamide is produced by polycondensation of a compound having an amino group and a compound having a carboxyl group. The prepolymer of a polycarbonate is produced by polycondensation of a compound having a carbonyl group which directly bonds to 2 groups such as an aryloxyl group or an alkoxyl group at both terminals and a compound having a hydroxyl group.

Typically, for example, the prepolymer of an aliphatic polyester is produced by polycondensation of a monomer having a hydroxyl group directly bonded to an aliphatic hydrocarbon group of 1 to 30 carbon atoms, such as ethylene, glycol, and a monomer having a carboxyl group directly bonded to an aliphatic hydrocarbon group of 1 to 30 carbon atoms, such as adipic acid or a monomer having a hydroxyl group and a carboxyl group directly bonded to an aliphatic hydrocarbon group of 1 to 30 carbon atoms, such as glycolic acid.

The prepolymer of an aliphatic aromatic polyester is produced by polycondensation of a monomer having a hydroxyl group directly bonded to an aliphatic hydrocarbon group of 1 to 30 carbon atoms, such as ethylene glycol, 1,3-propanediol, 1,3-butanediol, 1,4-butanediol, neopentylglycol, 2,6-naphthalenedicarboxylic acid, 1,6-hexamethylene glycol, 1,4-cyclohexanediol, and 1,4-cyclohexane dimethanol; and a monomer having a carboxyl group directly bonded to an aromatic hydrocarbon group of 6 to 30 carbon atoms, such as terephthalic acid, isophthalic acid, oxalic acid, succinic acid, adipic acid, dodecanedioic acid, fumaric acid, maleic acid, 1,4-cyclohexanedicarboxylic acid, 5-sodiosulfoisophthalic acid, 3,5-dicarboxybenzenesulfonic acid tetramethylphosphonium salt and 1,4-cyclohexanedicarboxylic acid; or a monomer with such a carboxylic group esterificated by a lower alcohol.

The prepolymer of an aromatic polyester is produced by polycondensation of a monomer having a hydroxyl group directly bonded to an aromatic hydrocarbon group of 6 to 30 carbon atoms, such as bisphenol A and a monomer having a carboxyl group directly bonded to an aromatic hydrocarbon group of 6 to 30 carbon atoms, such as terephthalic acid.

The prepolymer of an aliphatic polyamide is produced by polycondensation of a monomer having an amino group directly bonded to an aliphatic hydrocarbon group of 2 to 30 carbon atoms, such as hexamethylene diamine and a monomer having a carboxyl group directly bonded to an aliphatic hydrocarbon group of 1 to 30 carbon atoms, such as adipic acid.

The prepolymer of an aliphatic aromatic polyamide is produced by polycondensation of a monomer having an amino group directly bonded to an aliphatic hydrocarbon group of 2 to 30 carbon atoms, such as hexamethylenediamine and a monomer having a carboxyl group directly bonded to an aromatic hydrocarbon group of 6 to 30 carbon atoms, such as terephthalic acid.

The prepolymer of an aromatic polyamide is produced by polycondensation of a monomer having an amino group directly bonded to an aliphatic hydrocarbon group of 6 to 30 carbon atoms, such as p-phenylenediamine and a monomer having a carboxyl group directly bonded to an aromatic hydrocarbon group of 6 to 30 carbon atoms, such as terephthalic acid.

The prepolymer of an aliphatic polycarbonate is produced by polycondensation of a monomer having a hydroxyl group directly bonded to an aliphatic hydrocarbon group of 2 to 30 carbon atoms, such as 1,6-hexanediol and a monomer having a carbonyl group which directly bonds to phenoxyl group at both terminals, such as diphenyl carbonate.

The prepolymer of an aliphatic aromatic polycarbonate is produced by polycondensation of a monomer having a hydroxyl group directly bonded to an aliphatic hydrocarbon group of 2 to 30 carbon atoms, such as 1,6-hexanediol and a monomer having a hydroxyl group directly bonded to an aromatic hydrocarbon group of 6 to 30 carbon atoms, such as bisphenol A and a monomer having a carbonyl group which directly bonds to phenoxyl group at both terminals, such as diphenyl carbonate.

All of these prepolymers include those obtained by copolymerization in advance of a polyalkylene glycol such as polyethylene glycol, polypropylene glycol and polytetramethylene glycol.

On a specific method for producing the above-described prepolymers, for example, "Polymer Synthesis, vol. 1, second edition", 1992 (US, published by Academic Press, Inc.) can be seen as reference.

Degree of polymerization of the prepolymer suitable to the present invention can be specified by melt viscosity when evaluated under the condition of shear rate of 1000 (sec$^{-1}$) at temperature to execute polymerization in the polymerization reactor of the present invention. The preferable range is 60 to 100000 (poise). By controlling at 60 (poise) or higher, fierce foaming and scattering of the prepolymer discharged from the holes of the porous plate of the polymerization reactor can be suppressed and by controlling at 100000 (poise) or lower, by-products can efficiently be removed outside the system and thus polymerization progresses rapidly. Degree of polymerization of the prepolymer of the present invention is more preferably in the range of 100 to 50000 (poise), further preferably in the range of 200 to 10000 (poise) and particularly preferably in the range of 300 to 5000 (poise). Reason for the prepolymer with such relatively high viscosity is preferable in the present invention is to execute polymerization of a resin in the state of containing much quantity of foam as described above and thus polymerization rate increases significantly.

(C) The Polymerization Reactor:

The polymerization reactor of the present invention is apparatus characterized by feeding the above-described prepolymer in molten state to the polymerization reactor, discharging from the holes of the porous plate, followed by melt polycondensation while dropping along the supporting substrate under reduced pressure or in inert gas atmosphere under reduced pressure.

(C-1) The Porous Plate:

The porous plate is a plate-like substrate with multiple through holes. By using the porous plate, drift of the prepolymer can be suppressed and also local residence in the reactor can be prevented and thus a high quality and homogeneous resin can be produced.

As for structure of the porous plate, thickness is not especially limited, however, it is usually in the range of 0.1 to 300 mm, preferably in the range of 1 to 200 mm, further preferably in the range of 5 to 150 mm. The porous plate must endure against pressure of a feeding room of the melt prepolymer and also, when the supporting substrate of the polymerization room is fixed to the porous plate, it must have strength enough to support weights of the supporting substrate and the prepolymer dropping and reinforcement by a rib, and the like is also preferable.

Shape of holes of the porous plate is usually selected from such as circle, oval, triangle, slit, polygon and star shapes. Cross-sectional area of the hole is usually in the range of 0.01 to 100 $cm^2$, preferably in the range of 0.05 to 10 $cm^2$ and particularly preferably in the range of 0.1 to 5 $cm^2$. It is also included to install a nozzle, and the like connected to the hole.

Distance between the holes is usually, as distance between the centers, 1 to 500 mm, preferably 10 to 100 mm. The holes of the porous plate may be through-holes or may be tubes attached to the porous plate. They may be in taper-like. It is preferable to determine hole size and shape so that pressure loss when the prepolymer passes through the porous plate is 0.1 to 50 $kg/cm^2$.

Number of holes of the porous plate is not especially limited and depends on conditions such as reaction temperature or pressure, catalyst amount and molecular weight range to be polymerized, however, it is usually necessary to be, in producing a polymer at 100 kg/hr, 10 to $10^5$, more preferably 50 to $10^4$ and further preferably $10^2$ to $10^3$.

As the porous plate material, metal material is usually preferable, such as stainless steel, carbon steel, Hastelloy, nickel, titanium, chromium and other alloys.

A method for discharging the prepolymer through such a porous plate includes a method for dropping by liquid head or own weight, a method for extrusion by pressurization using a pump, and the like, however, it is preferable to extrude out using a pump with weighing ability such as a gear pump to suppress variation of the amount of the prepolymer to be dropped.

It is preferable to install a filter in flow passage at the upstream side of the porous plate. By using the filter, foreign matters to clog the holes of the porous plate can be removed. Kinds of the filter can be selected, as appropriate, so as to remove foreign matters larger than hole diameter of the porous plate and not to fracture by passing through of the prepolymer.

(C-2) The Supporting Substrate:

The prepolymer discharged from the holes of the porous plate drops along the supporting substrate. Typical structure of the supporting substrate includes "wire-like", "chain-like" combined with wire-like material or "lattice-like (metal net-like", "stereo lattice-like" with wire-like material connected just like a jangle gym, "thin plate-like" with flat surface or curvature and "porous plate-like" structure. In addition to these, to efficiently draw out reaction byproducts or impurities generated by thermal decomposition during polymerization, active stirring and surface renewal are preferable by increasing surface area of a resin to be dropped, along with by dropping the prepolymer along the supporting substrate with ruggedness for drop direction. The supporting substrate with structure to interrupt resin dropping such as "wire-like structure with ruggedness for resin drop direction" is also preferable. Combination of these supporting substrates can also be used.

A "Wire-like" substrate represents material with very large ratio between average length of peripheral of the cross-section and length in direction perpendicular to said cross-section. The cross-sectional area is not especially limited, however, it is usually in the range of $10^{-3}$ to 10 $cm^2$, preferable in the range of $10^{-3}$ to $10^1$ $cm^2$ and particularly preferable in the range of $10^{-2}$ to 1 $cm^2$. Shape of the cross-section is not especially limited, however, it is usually selected from such as circular-like, oval-like, triangle-like, quadrangle-like, polygon-like and star-like shapes. The cross-sectional shape includes any of the same or different one in length direction. Wires with hollow part are also included. A single wire type or a multiply combined wire by a method for twisting, and the like is also included. Wires with smooth or rugged surface or partial protrusions are also included.

"Chain-like" substrate represents material with rings made of the above-described wire-like material connected. Ring shape includes such as circle, oval, rectangle and square. A method for connecting includes 1-dimensional, 2-dimensional and 3-dimensional ones.

"Lattice-like (metal net-like)" substrate represents the above-described wire-like material combined in lattice state. Wires to be combined include linear ones or curved ones and angle to be combined can arbitrarily selected. Area ratio between material and space when "lattice-like (metal net-like)" material is projected from vertical direction for the surface is not especially limited, however, it is usually in the range of 1:0.5 to 1:1000, preferably in the range of 1:1 to 1:500 and particularly preferably in the range of 1:5 to 1:100. The area ratio is preferably the same in horizontal direction, while in vertical direction it may be the same or the space ratio is preferably larger in lower part.

"Stereo lattice-like" substrate represents wire-like material stereoscopically combined just like a jangle gym in 3D lattice. Wires to be combined includes linear one or curved one and angle to be combined can arbitrarily selected.

"Wire-like structure with ruggedness for polymer drop direction" substrate represents wires attached with rods having circular or polygonal cross-section in right angle or wires attached with disk-like or cylinder-like substance. Step difference of the ruggedness is preferably not smaller than 5 mm. A typical example includes a wire with disks, through which the wire is penetrating, and the disks have diameter larger than wire diameter by not less than 5 mm but not larger than 100 mm and thickness of 1 to 50 mm, and attached in space of 1 to 500 mm distance.

Volume ratio between the supporting substrate installed in a reactor and space in the reactor is not especially limited, however, it is usually in the range of 1:0.5 to $1:10^7$, preferably in the range of 1:10 to $1:10^6$ and particularly preferably in the range of 1:50 to $1:10^5$. The volume ratio between the supporting substrate and space in the reactor is preferably the same in horizontal direction, while in vertical direction it may be the same or the space volume ratio in the reactor is preferably larger in lower part.

Whether a single supporting substrate is installed or multiple supporting substrates are installed can be selected, as appropriate, depending on the shape. The "wire-like" or "chain-like" supporting substrate is usually installed by 1 to $10^5$ pieces, preferably 3 to $10^4$ pieces. The "lattice-like" or "chain-like connected in two dimension", "thin plate-like" and "porous plate-like" supporting substrates are usually installed by 1 to $10^4$ pieces, preferably 2 to $10^3$ pieces. The "stereo lattice-like" and "chain-like connected in three dimension" supporting substrates can be installed in single or multiple in divisions, as appropriate, by consideration of apparatus size or installment space.

When multiple supporting substrates are installed, it is preferable that they are separated not to contact each other by using spacers, as appropriate.

Material of the supporting substrate is not especially limited, however, it is usually selected from such as stainless steel, carbon steel, Hastelloy and titanium. Wires after various surface treatments such as plating, lining, passive treatment and acid cleaning are also included.

In the present invention, the prepolymer is usually fed from one or more holes of the porous plate based on one supporting substrate, however, number of holes can be selected, as appropriate, depending on shape of the supporting substrate. The prepolymer may also be dropped along multiple supporting substrates after passing through one hole.

Location of the supporting substrate is not especially limited, as long as the prepolymer can drop along the supporting substrate and an attachment way of the supporting substrate to the porous plate can be selected, as appropriate, from a case where it is installed by penetrating the hole of the porous plate and a case where it is installed by not penetrating the hole of the porous plate but beneath the hole of the porous plate.

Height for dropping the prepolymer along the supporting substrate after passing through the hole is preferably in the range of 0.5 to 50 m, preferably in the range of 1 to 20 m and more preferably in the range of 2 to 10 m.

(C-3) Heating Apparatus:

Polymerization temperature can suitably be set by controlling temperature of a heater or a heat media jacket arranged at wall surface of the polymerization reactor covering the supporting substrate or by putting a heater or heat media inside the supporting substrate to control these temperatures.

(C-4) Pressure Reducing Apparatus:

Degree of reduced pressure in the polymerization reactor can suitably be set by connecting an exhaust port for decompression installed at arbitrary place of the polymerization reactor to a vacuum line to control degree of reduced pressure. From the exhaust port for decompression, polymerization by-products, impurities generating by thermal decomposition during polymerization and inert gas optionally introduced into the polymerization reactor are discharged.

(C-5) Inert Gas Feeding Apparatus:

To execute a reaction in inert gas atmosphere under reduced pressure, and when inert gas is directly introduced into the polymerization reactor, it can be fed from an introduction port installed at arbitrary position of the polymerization reactor. Position of the inert gas introduction port is preferably far from the porous plate and near a resin drawn out port. It is also preferable that it is apart from the exhaust port for decompression.

A method for absorbing and/or containing inert gas to the prepolymer in advance is also possible, and in this case, inert gas feeding apparatus is additionally installed at the upstream of the polymerization reactor of the present invention.

As for inert gas feeding apparatus, a method for using known absorption apparatus such as a packed column type absorption apparatus, a plate type absorption apparatus and a spray tower type absorption apparatus described, for example, in "Chemical Apparatus Design and Operation" series, No. 2, revised, "Gas Absorption", P. 49 to 54 (published 15 Mar. 1981 from Chemical Industry Co., Ltd.) or a method for injection of inert gas into a pipeline for transferring the prepolymer is included. Most preferable method is using apparatus for absorption of inert gas while dropping the prepolymer along the supporting substrate in inert gas atmosphere. In this method, inert gas with higher pressure than that in the polymerization reactor is introduced inside apparatus for inert gas absorption. Pressure here is preferably 0.01 to 1 MPa, more preferably 0.05 to 0.5 MPa and further preferably 0.1 to 0.2 MPa.

(D) The Polymerization Method:

We have found that by polymerization of the prepolymer with melt viscosity in the range described above, using the above-described polymerization reactor, under the range of polymerization temperature and degree of reduced pressure as described later, scattering of the prepolymer by fierce foaming just under the porous plate is suppressed and resin quality deterioration by contamination at nozzle surface or wall surface of the polymerization reactor is also suppressed and surprisingly observed phenomena of "increased resin surface area" by inclusion of much quantity of foam in the resin dropping along the supporting substrate and "rolling down of the resin in circular foam on the supporting substrate". At the same time, it was confirmed dramatic increase in polymerization rate and improvement of resin hue.

Dramatic increase in polymerization rate is considered to be brought about by composite action of increasing effect of resin surface area by inclusion of much quantity of foam and surface area renewal effect by plasticization action of foam. The plasticization action of foam makes possible improvement of resin hue by shortening of resin residence time inside the polymerization reactor and easy drawing out of a high viscosity resin after polymerization to high degree, from the polymerization reactor.

Melt thin film polymerization apparatus of a dropping type by gravitational force such as a conventional wetted-wall tower, to obtain a high quality resin with high degree of polymerization, aims at polymerization of the prepolymer with small coloring degree obtained at early reaction stage and far lower degree of polymerization compared with a method of the present invention, at higher temperature and in shorter residence time compared with the present invention. Based on conventional common sense, subsequent melt polymerization of the prepolymer with high degree of polymerization and high melt viscosity as in a method of the present invention has been considered to result in significant progress of coloring and excessively longer residence time during dropping in the polymerization reactor, and thus production of a high quality resin was never thought of.

On the contrary, in the present invention, as described above, by setting melt viscosity range of the prepolymer at higher level against conventional common sense or farther, as explained later, by setting polymerization temperature at lower level against conventional common sense, it was found that resin foaming state can be controlled and polymerization rate can significantly be enhanced in spite of the low temperature and surprising effect that a resin with high degree of polymerization can easily be drawn out.

(D-1) Polymerization Temperature:

Polycondensation reaction temperature is preferably not lower than a temperature lower than crystal melting point by 10° C. of a polycondensation resin and not higher than a temperature higher than crystal melting point by 60° C. By setting the temperature not lower than a temperature lower than crystal melting point by 10° C., solidification of reaction products or lengthening of reaction time can be suppressed and by setting temperature not higher than a temperature higher than crystal melting point by 60° C., thermal decomposition can be suppressed and a resin with superior hue can be produced. This temperature is more preferably not lower than a temperature lower than crystal melting point by 50° C. and not higher than a temperature higher than crystal melting point by 40° C., and further preferably not lower than crystal melting point and not higher than a temperature higher than crystal melting point by 30° C. Reasons for preference of such relatively low reaction temperature in the present invention are easy inclusion of much quantity of foam by a resin and possibility of dramatic increase in polymerization rate.

"Crystal melting point" here is peak temperature of an endothermic peak derived from crystal melting, when measured under the following conditions, using "Pyris 1 DSC" from Perkin Elmer Co., Ltd. (input compensation type differential scanning calorimeter). The peak temperature was determined using attached analysis software.

Measurement temperature: 0 to 300° C.
Temperature rising rate: 10° C./min.

(D-2) Polymerization Pressure:

The melt polycondensation reaction of the present invention must be carried out under reduced pressure to secure resin state containing much quantity of foam. Degree of reduced pressure is adjusted, as appropriate, in response to sublimation state of the prepolymer or polycondensation reaction products or reaction rate. Degree of reduced pressure is preferably not higher than 50000 Pa, more preferably not higher than 10000 Pa, further preferably not higher than 1000 Pa and particularly preferably not higher than 500 Pa. The lower limit is not especially limited, however, it is preferably not lower than 0.1 Pa in view of scale of apparatus for creating reduced pressure inside the polymerization reactor.

It is also a preferable method that by introducing small amount of inert gas not adversely affecting a polycondensation reaction into the polymerization reactor, polymerization by-products or impurities generating by thermal decomposition during polymerization are removed with the gas.

Introduction of inert gas into the polymerization reactor has conventionally been understood to advantageously progress a reaction by reducing partial pressure of polymerization by-products and shifting equilibrium. However, inert gas introduced in the present invention is sufficient in very small amount and thus the increasing effect of polymerization rate due to partial pressure reduction effect is little expected and thus the role of inert gas cannot be explained based on conventional understanding.

As the result of investigation by us, it was astonishingly observed that by introduction of inert gas into the polymerization reactor, foaming phenomenon of the prepolymer dropping along the supporting substrate in molten state became fierce which dramatically increase surface area of said prepolymer and provides very good surface renewal state. The reason is not certain, however, this change in inner and surface states of this prepolymer is estimated to cause dramatic enhancement of polymerization rate.

Inert gas to be introduced is preferably such gas as not badly influencing a resin such as coloring, metamorphism and decomposition and includes nitrogen, argon, helium, carbon dioxide or lower hydrocarbon gas and mixture gas thereof. As the inert gas, nitrogen, argon, helium and carbon dioxide are preferable and nitrogen is particularly preferable among them in view of easy availability.

Very small introduction amount of the inert gas is sufficient in the present invention such as preferably 0.05 to 100 mg based on 1 g of a resin to be drawn out from the polymerization reactor. By setting the amount of the inert gas to not lower than 0.05 mg based on 1 g of a resin to be drawn out, resin foaming becomes sufficient and the increasing effect of the degree of polymerization becomes high. While, by setting at not higher than 100 mg, it becomes easy to increase degree of reduced pressure. The amount of the inert gas is more preferably 0.1 to 50 mg based on 1 g of a resin to be drawn out and particularly preferably 0.2 to 10 mg.

A method for introduction of the inert gas includes a direct introducing method into the polymerization reactor, an introduction method into the polymerization reactor, by absorption and/or inclusion of the inert gas beforehand into the prepolymer and releasing said absorbed and/or included gas from the prepolymer under reduced pressure and a combined method thereof. "Absorption" here means a case wherein the inert gas is dissolved in a resin and not present as air bubbles, whereas "inclusion" means presence as air bubbles. In case of presence as air bubbles, size of the air bubbles is preferably as small as possible, and average diameter of the air bubbles is preferably not larger than 5 mm and more preferably not larger than 2 mm.

(D-3) Polymerization Time:

Polymerization time is total of time required for a resin to drop along the supporting substrate and residence time at the bottom of the polymerization reactor and preferably in the range of 10 seconds to 100 hours, more preferably in the range of 1 minute to 10 hours, further preferably in the range of 5 minutes to 5 hours, particularly preferably in the range of 20 minutes to 3 hours and most preferably in the range of 30 minutes to 2 hours.

In the present invention, to suppress thermal decomposition in such as the bottom part of the polymerization reactor or a draw out pipeline, it is preferable to shorten residence time in these areas.

(D-4) Polymerization Rate:

Polymerization ability of the polymerization reactor of the present invention has features, such as, in case of using the wire-like supporting substrate, increase in proportion to numbers of the substrate installed inside the polymerization reactor and easy design for scale up.

In case of using the wire-like supporting substrate, flow rate of the prepolymer per substrate is preferably $10^{-2}$ to $10^2$ L/hr and by setting the flow rate within this range, sufficient production ability can be secured and also polymerization rate can dramatically be enhanced. More preferably, the flow rate is in the range of 0.1 to 50 L/hr.

In case of adopting the supporting substrate by combination of wires such as the lattice-like (metal net-like) substrate, the flow rate is preferably $10^{-2}$ to $10^2$ L/hr per wire structure in vertical direction composing the supporting substrate, more preferably in the range of 0.1 to 50 L/hr.

In case of adopting the supporting substrate without structure by combining wires, such as the thin plate-like substrate, the flow rate is preferably $10^{-2}$ to $10^2$ L/hr per hole of the porous plate feeding the prepolymer into the supporting substrate, more preferably in the range of 0.1 to 50 L/hr.

(D-5) Molecular Weight Regulator:

In the present invention, if necessary, in arbitrary step before feeding the prepolymer into the polymerization reactor of the present invention, the prepolymer can be reacted with a molecular weight regulator in arbitrary amount. We have found that, by changing molecular weight of the prepolymer to be fed in the polymerization reactor of the present invention, dropping rate of the prepolymer along the supporting substrate can dramatically be changed, by which residence time in the polymerization reactor can be controlled and quality such as degree of polymerization of a resin to be produced and production amount can be easily controlled in wide range.

As the molecular weight regulator, a molecular weight decreasing agent or a molecular weight increasing agent is used. In the present invention, by using the molecular weight regulator, quality such as degree of polymerization of a polycondensation polymer and production amount can be adjusted in wide range not attainable by a conventional polymerization process.

When a molecular weight decreasing agent is used, degree of polymerization of a polycondensation polymer to be produced in the polymerization reactor of the present invention can be lowered in wide range only by the addition of relatively small amount of the molecular weight decreasing agent. This is because, in addition to the original effect of the molecular weight decreasing agent, there is also the effect of shortening reaction time by increasing dropping rate of the prepolymer along the supporting substrate. To be able to widely lower degree of polymerization of a polycondensation polymer to be produced has the same meaning of dramatical reduction of production amount.

On the contrary, in a conventional polymerization method, only the original effect of a molecular weight decreasing agent is fulfilled, and degree of polymerization of a polycondensation polymer is lowered responding only to the addition amount of the molecular weight decreasing agent and thus to adjust in wide range, much quantity of the addition is required, which poses a problem in view of operation, cost and also product quality. While when the molecular weight increasing agent is used, degree of polymerization of a polycondensation polymer to be produced in the polymerization reactor of the present invention can significantly be increased only by the addition of relatively small amount of the molecular weight increasing agent. This is because, in addition to the original effect of the molecular weight increasing agent, there is also the effect of extending reaction time by lowering dropping rate of the prepolymer along the supporting substrate. To be able to widely increase degree of polymerization of a polycondensation polymer to be produced has the same meaning as ability to dramatically increase production amount. On the contrary, in a conventional polymerization method, only the original effect of the molecular weight increasing agent is fulfilled, and degree of polymerization of a polycondensation polymer is increased responding only to the addition amount of the molecular weight increasing agent and thus to adjust in wide rage, large quantity of the addition is required, which poses a problem in view of operation, cost and also product quality.

When molecular weight of the prepolymer fed from a production step of the prepolymer varies, the variation state is detected, based on which result, the molecular weight regulator is added to the prepolymer at the step before feeding the prepolymer into the polymerization reactor, by which change in molecular weight is absorbed and the prepolymer can also be introduced into the polymerization reactor in the state of small change in molecular weight.

The molecular weight regulator can be reacted with the prepolymer at an arbitrary step before feeding the prepolymer into the polymerization reactor. This reaction may be carried out by installing a separate reactor or in a pipeline by introducing the molecular weight regulator into the pipeline for feeding the prepolymer. It is a preferable method that mixing and reaction of the molecular weight regulator are promoted by utilization of mixing apparatus with a drive unit such as an extruder or static mixing apparatus.

As the molecular weight decreasing agent, such known one as is used for depolymerization or molecular weight decreasing of a polymer can be used, as appropriate, depending on polymer kinds. It is also preferable to utilize a raw material monomer as described above or the prepolymer with lower molecular weight sampled from a step nearer to raw material or a compound by-produced by a polycondensation reaction as the molecular weight decreasing agent.

For example, in case of a polyester resin, a mixture can be used consisting of one or more kinds of those selected from compounds having two or less hydroxyl groups directly bonded to an aliphatic hydrocarbon group of 1 to 30 carbon atoms, such as ethylene glycol, 1,3-propanediol, 1,4-butanediol, neopentylglycol, 1,6-hexamethyleneglycol, 1,4-cyclohexanediol, methanol, ethanol, propanol, butanol and benzylalcohol; or an alkylene glycol, such as diethylene glycol, triethylene glycol, tetraethylene glycol, dipropylene glycol and tripropylene glycol; or water; or compounds having two or less carboxyl groups directly bonded to an aromatic hydrocarbon group of 6 to 30 carbon atoms such as terephthalic acid, isophthalic acid, naphthalene dicarboxylic acid, 5-sodiosulfoisophthalic acid and 3,5-dicarboxybenzenesulfonic acid tetramethylphosphonium salt; or compounds having two or less carboxyl groups directly bonded to an aliphatic hydrocarbon group of 1 to 30 carbon atoms, such as formic acid, acetic acid, propionic acid, butanoic acid, oxalic acid, succinic acid, adipic acid, dodecanedioic acid, fumaric acid, maleic acid and 1,4-cyclohexanedicarboxylic acid; or compounds having a hydroxyl group and a carboxyl group directly bonded to an aliphatic hydrocarbon group of 1 to 30 carbon atoms, such as lactic acid and glycolic acid; or compounds having such a carboxylic group esterificated by a lower alcohol.

Also in case of a polyamide resin or a polycarbonate resin, a raw material monomer as described above or the prepolymer with lower molecular weight sampled from a step nearer to raw material or a compound by-produced by a polycondensation reaction can be used as the molecular weight decreasing agent. It is also possible that the above-described molecular weight decreasing agent for a polyester resin is used instead as the molecular weight decreasing agent for a polyamide resin or a polycarbonate resin, or on the contrary, the above-described molecular weight decreasing agent for these resins is used as the molecular weight decreasing agent for a polyester resin. Furthermore, the following methods are possible;

suppressing molecular weight increase: by suppression of a polycondensation reaction by the addition of a compound with suppression function of polymerization catalytic action such as water and trimethyl phosphate;

decreasing molecular weight as well as suppressing molecular weight increase: by the addition of a monofunctional group to be an end-cap agent for reaction or a difficult-to-react compound;

suppressing a polycondensation reaction: by lowering temperature of the prepolymer by the addition of the prepolymer with lower temperature or by mixing a part of the prepolymer adjusted to have locally lower temperature with other portion.

The molecular weight increasing agent is not especially limited as long as it has action of increasing molecular weight of the prepolymer. The method for increasing molecular weight is represented by one or more kinds selected from the following means:

addition of the prepolymer with higher molecular weight sampled from a step nearer to a product, or the product having high molecular weight polymer, or a high molecular weight polymer produced by other polymerization technology such as a solid phase polymerization method to increase molecular weight by an exchange reaction;

partial cross-linking reaction by the addition of a compound having three or more functional groups which are condensation reactable, such as glycerine, pentaerythritol, sorbitol, 1,2,4-benzenetricarboxylic acid and citric acid;

acceleration of polycondensation reaction by the addition of, or by the addition of more than ordinal amount of a hydrolysate obtained by hydrolysis of titanium oxide, titanium tetrabutoxide, titanium tetraisopropoxide, titanium halide or titanium alkoxide; a hydrolysate obtained by hydrolysis of germanium oxide, germanium isopropoxide, germanium alkoxide; and a compound containing titanium, germanium, antimony, tin, aluminum, cobalt and having polymerization catalysis action, such as antimony oxide, tin acetate, tin 2-ethylhexanate, aluminum acetate, aluminum propionate, aluminum lactate, aluminum chloride, aluminum hydroxide, aluminum carbonate, aluminum phosphate, aluminum ethoxide, aluminum isopropoxide, aluminum acetylacetonate and cobalt acetate;

promotion of a polycondensation reaction by the addition of the prepolymer heated up to higher temperature or by mixing a part of the prepolymer heated to locally higher temperature with other portion to increase temperature of the prepolymer.

(D-6) Others:

The present invention includes a case wherein various additives, if necessary, are copolymerized or mixed, such as a matting agent, a heat stabilizer, a flame retardant, an antistatic agent, a defoaming agent, an orthochromatic agent, an antioxidant, a UV absorber, a crystal nucleating agent, a brightening agent and an impurity scavenger. These stabilizers or various additives can be added at arbitrary stages till molding.

In particular, in the present invention, it is preferable that a suitable stabilizer is added depending on a polymer to be polymerized. For example, in case of a polyester resin, a pentavalent and/or trivalent phosphorous compound or a hindered phenol based compound is preferable. The addition amount of the phosphorous compound is preferably 2 to 500 ppm as weight ratio of a phosphorous element in a polymer, more preferably 10 to 200 ppm. As specific compounds, trimethyl phosphite, phosphoric acid and phosphorous acid are preferable. A phosphorous based compound is preferable because of not only suppressing polymer coloring but also having effect of a crystal nucleating agent.

A hindered phenol based compound is a hindered phenol based derivative having a substituent with steric hindrance at the adjacent position of a phenolic hydroxyl group and a compound having at least one ester bond in a molecule. The addition amount of the hindered phenol based compound is preferably 0.001 to 1% by weight based on a polymer obtained, more preferably 0.01 to 0.2% by weight. Specific compounds include pentaerythritol tetrakis[3-(3,5-di-tert-butyl-4-hydroxyphenyl)propionate], 1,1,3-tris(2-methyl-4-hydroxy-5-tert-butylphenyl)butane, octadecyl 3-(3,5-di-tert-butyl-4-hydroxyphenyl)propionate, N,N'-hexamethylenebis (3,5-di-tert-butyl-4-hydroxyhydrocinnamide). Combined use of these stabilizers is one of the preferable methods.

In the present invention, it is also preferable to add a crystal nucleating agent, and in case of a polyester resin, such as a phosphorous based compound, a metal salt of an organic acid and powder of polyolefin or other resins are preferable. The addition amount of the crystal nucleating agent is preferably 2 to 1000 ppm in a polymer, more preferably 10 to 500 ppm. Specifically included are phosphates such as a phosphoric acid 2,2'-methylenebis(4,6-di-t-butylphenyl) sodium salt, a phosphoric acid bis(4-t-butylphenyl) sodium salt; and sorbitols such as bis(p-methylbenzylidene)sorbitol; and metal element containing compounds such as a bis(4-t-butylbenzoic acid) hydroxyaluminum salt. In particular, for preform used for a PET bottle by heating at the mouth portion for thermal crystallization, it is preferably used to promote crystallization and to lower thermal crystallization temperature.

In the present invention, the addition of a scavenger for volatile impurities with low molecular weight is also one of the preferable methods. In case of PET, impurity is acetaldehyde and a scavenger for that includes a polymer or an oligomer of polyamide, or a polyesteramide, or a low molecular weight compound having an amide group or an amine group, such as 2-aminobenzamide. Specific examples of such compounds include polymers such as a polyamide of nylon 6,6, nylon 6 and nylon 4,6 or polyethylene imine, moreover reaction products between N-phenylbenzene amine and 2,4,4-trimethylpentene, or Irganox-1098, Irganox-565 (registered trade mark) manufactured by Ciba Specialty Chemicals Co. Ltd., and the like. These scavengers are preferably added at a step between resin discharge from the polymerization reactor and its feed to a molding machine.

(E) The Molding Method:

A polymer produced by polymerization may be used in molding by re melting after once pelletized, however, the polymer can be transferred to a molding machine in molten state to mold. By this means, not only complicated steps such as transportation, storage and drying before molding of pellets and energy can be reduced but also a far high quality molded product can be produced.

When a polymer produced by polymerization is transferred in molten state to a molding machine for molding, to produce a molded product with small variation of quality and weight, the following methods are taken: adjustment of transferring pressure of a resin to a molding machine in constant (E-1) and adjustment of polymer melt residence time at the upstream of a molding machine in constant (E-2).

By the polymerization reactor based on novel principle of the present invention, melt polycondensation at far low temperature is possible than in conventional polymerization technology, which provides small variation of quality and melt viscosity of a molten resin fed into a molding machine, and thus a molded product with small variation of quality and weight and/or pellets with small quality variation can stably be produced by installment of at least two discharge pumps to the polymerization reactor of the present invention and feeding a resin to each of a separate molding machine and/or a pelletizer (E-3). It is naturally a preferable method that an (E-3) method is used in combination with (E-1) and (E-2) methods.

Furthermore, by the polymerization reactor of the present invention, it is also possible that at least a part of a polycondensation polymer produced in amount over the amount to be used in molding or pelletizing is returned for re-circulation to an arbitrary step among producing steps for said polycondensation polymer (E-4).

The (E-1 to E-4) methods are each explained below.

(E-1) A Method for Adjusting Resin Transfer Pressure to a Molding Machine:

In a production method for a molded product of the present invention, to adjust resin transfer pressure to a molding machine constant, the transfer pressure to a molding machine is required to be maintained arbitrarily at pressure from 0.1 to 100 MPa (absolute pressure).

When the transfer pressure to a molding machine varies, it is difficult to maintain constant resin feed amount to a molding machine. In particular, when an injection molding machine is used, a weighing step of resin received and an injection or cooling step without receiving a resin are repeated, which makes resin flow intermittent and thus variation of the transfer pressure to a molding machine is inevitable and poses a problem of weight variation of a molded product.

The transfer pressure to a molding machine is preferably not lower than 0.1 MPa to accurately feed a highly viscous resin in a molding machine and preferably not higher than 100 MPa in view of apparatus scale or resin leak prevention from pipeline connection part. More preferably it is in the range of 0.5 to 70 MPa, further preferably in the range of 1 to 50 MPa and most preferably in the range of 2 to 30 MPa. By maintaining the transfer pressure at high level, smaller volume (smaller diameter) of a transfer pipeline for a molten resin is applicable, and melt residence time in resin transferring can be preferably shortened. Particularly most preferable range is 3 to 20 MPa.

In adjustment of the transfer pressure to a molding machine constant, it is preferable that pressure variation is small and to prevent weight variation of a molded product, it is preferably not over ±80% of set pressure, more preferably not over ±50%, particularly preferably not over ±30% and most preferably not over ±20%.

By adopting such a method, it is possible to adjust the resin feed amount to various molding machines including an injection molding machine constant and even when multiple same or different kinds of molding machines are used, resin feed amount can be adjusted constant without a complicated switching system and sequence. Also in molding using multiple molding machines, even when a part of a molding machine is down by accident, production of a molded product with stable quality and weight can be possible by other molding machines.

As described above, means to control the transfer pressure to a molding machine is not especially limited and conventionally known methods can be used and preferable control methods are specifically explained below (E-1-1 and E-1-2)

(E-1-1) A Method for Controlling the Transfer Pressure by Adjusting Output Amount of the Discharge Pump:

The transfer pressure is detected in a pipeline to transfer a molten resin from the polymerization reactor to a molding machine, and output of the discharge pump is controlled so that the transfer pressure is maintained at arbitrary level between 0.1 to 100 MPa (absolute pressure). In this case, it is preferable that pressure variation is small and it is preferably not over ±80% of set pressure to prevent weight variation of a molded product.

(E-1-2) A Method for Controlling the Transfer Pressure by Returning a Part of a Resin Discharged to the Polymerization Reactor While Maintaining Output Amount of the Discharge Pump Constant:

In this method, the discharge pump of the polymerization reactor is controlled so as to maintain a selected output amount from 1.0 to 100 times the feed amount of the prepolymer. The output amount of the discharge pump is preferably not lower than 1.0 times the feed amount of the prepolymer to prevent resin residence in the polymerization reactor and preferably not higher than 100 times in view of apparatus scale, more preferably in the range of 1.1 to 50 times, further preferably in the range of 1.15 to 20 times and most preferably in the range of 1.2 to 5 times.

In addition to a pipeline to transfer a molten resin from the polymerization reactor to a molding machine, after said discharge pump, a pipeline is installed to return a part of the discharged resin to the bottom of said polymerization reactor and a system for output pressure detection and opening degree control of a polymer return valve or a back pressure valve is installed at the pipeline to return a resin to the bottom.

The transfer pressure is detected in the pipeline to transfer a molten resin from the polymerization reactor to a molding machine, and opening degree of the system for output pressure detection and opening degree control of a polymer return valve or the back pressure valve is controlled so that the transfer pressure is maintained at arbitrary level between 0.1 to 100 MPa (absolute pressure). In this case, it is preferable that pressure variation is small and it is preferably not over ±80% of set pressure to prevent weight variation of a molded product.

This method provides constant output amount of the discharge pump, resulting in small load to the discharge pump and small accident risk and thus preferable.

(E-2) A Control Method for Polymer Melt Residence Time:

In a method for production of the molded product of the present invention, it is possible to polymerize at low temperature never attained by conventionally known polymerization apparatus and even when polymer melt residence time varies at the upper stream of a molding machine, variation of quality or weight of a molded product is small. As a method for further maintaining polymer melt residence time constant at the bottom of the polymerization reactor, by installing a discharge pump connected to a pelletizer and/or a discharge nozzle at the bottom of the polymerization reactor or after the discharge pump of the polymerization reactor, a polymer can be transferred to the pelletizer and/or the discharge nozzle so that molten polymer residence time at the bottom of the polymerization reactor is controlled to selected time between 0.1 to 120 minutes. By means of this, even in case of mutual variation of "resin producing rate" and "resin molding rate", variation of molten polymer residence time at the bottom of the polymerization reactor can be avoided, which otherwise affect polymer quality, and stable production in time course is possible with little variation of quality and weight of a molded product.

Polymer melt residence time at the bottom of the polymerization reactor is preferably not shorter than 0.1 minute in view of maintaining air tightness of the discharge pump and preferably not longer than 120 minutes in view of suppressing thermal decomposition of a resin, more preferably in the range of 0.2 to 60 minutes, further preferably in the range of 0.3 to 30 minutes and particularly preferably in the range of 0.4 to 15 minutes.

When polymer melt residence time at the bottom of the polymerization reactor varies largely, resin quality or melt viscosity may vary and thus it is preferably maintained constant, preferably not over ±100% of specified polymer melt residence time, more preferably not over ±80%, particularly preferably not over ±50%, most preferably not over ±30% and particularly most preferably not over ±20%.

(E-3) A Method for Installing at Least Two Discharge Pumps at the Polymerization Reactor of the Present Invention:

To stably produce a molded product with small variation of quality and weight and/or pellets with small quality variation by connecting multiple molding machines and/or pelletizers to the polymerization reactor of the present invention, it is a preferable method that by installing at least two discharge pumps at said the polymerization reactor and a resin is fed to multiple molding machines and/or pelletizers.

It is preferable to compose a production line wherein at least one or more molding machines and/or pelletizers are connected by each discharge pump. These molding machines and/or pelletizers can simultaneously mold and/or pelletize and can also mold or pelletize using one desired molding machine or pelletizer per production line by installing a switching valve at a branch pipeline connecting the discharge pump and multiple molding machines or pelletizers.

As described above, by installing at least two discharge pumps, at least two production lines are composed, which makes change in production or kind of a molded product by each line easy. By this method, even when at least one of the lines is stopped by accident or maintenance, the production can be continued by adjusting production amount of other lines.

Output amount of the discharge pump of each line can be adjusted in response to a production planning of a molding machine or a pelletizer and in case of an injection molding machine, it can be synchronized with the weighing-injection cycle or output amount of the discharge pump may also be controlled so that the transfer pressure to the injection molding machine is maintained arbitrarily at pressure from 0.1 to 100 MPa (absolute pressure). By returning a part of a resin discharged to the bottom of the polymerization reactor or transferring to the discharge nozzle or the pelletizer installed separately from a molding machine while controlling to selected output amount between 1.0 to 100 times the feed amount of the prepolymer, the transfer pressure to the molding machine can also be controlled.

(E-4) A Method for Re-Circulation at Least a Part of a Polycondensation Polymer Produced in Amount Over the Amount to be Used in Molding or Pelletizing to an Arbitrary Step Among Producing Steps for Said Polycondensation Polymer:

In the above-described method (E-2), by returning drawn out resin from the discharge nozzle or the pelletizer to avoid variation of polymer melt residence time at the upper stream of a molding machine, to arbitrary step among production steps of said polycondensation polymer, loss can be suppressed to the minimum.

These polycondensation polymers other than the amount to be used for molding products or pellets, which are originally aimed at, are named "excess polymers" hereinafter.

For re-circulation, "excess polymers" can be, for example, either introduced from the porous plate of the polymerization reactor based on novel principle of the present invention, introduced by installing a nozzle at arbitrary position such as the bottom of said polymerization reactor, or joined into flow of said polycondensation polymer at the upper stream of said polymerization reactor from apparatus to produce the prepolymer, or a raw material monomer tank, or arbitrary position of a pipeline connecting these.

When "excess polymers" are jointed into flow of said polycondensation polymer, to make variation of polymer residence time in a polymerization system small, it is also a preferable method that flow amount of a raw material monomer or the prepolymer from the upper stream of the junction is decreased in response to the amount of excess polymers joined. When "excess polymers" are generated in large quantity, to minimize increase in residence time at the upstream of the junction, it is also a preferable method to join at the upper stream such as a raw monomer tank, the first or second reactor to produce the prepolymer, in particular, a reactor to generate an initial condensation product or the first polycondensation reactor. When "excess polymers" are generated in small quantity, it is also a preferable method to joint into the final reactor nearest to the discharge part of "excess polymers".

It is also a preferable method that "excess polymers" are joined with small amount of the prepolymer having low degree of polymerization or a raw material monomer in advance to make mixing easy before join of the polymers to flow of said polycondensation polymer. A method for using a static mixer or a preliminary mixing tank of stirring tank type, kneader type or extruder type for this purpose is also preferable.

All of "excess polymers" may be joined into flow of said polycondensation polymer for circulation or only a part may be circulated to stabilize a polymer system in early stage and the rest can be recovered as pellets or wasted or scrapped.

(E-5) Other Molding Conditions:

A polymer once pelletized, in particular in case of a highly crystalline polymer, requires heating at high temperature in melt processing and moreover easy to generate shear heat, which posed a problem of significant quality deterioration. However, pellets and a molded product produced by a method for polymerization and a method for molding of the present invention have small quality deterioration before and after melt processing. This is considered to occur because polymerization temperature is low in a method for polymerization of the present invention and moreover polymerization is completed in a short time, and due to absence of a rotational driving unit or resin residence area in polymerization apparatus itself, there is little air ingress, scission of molecular chains by sear and resin deterioration by melt residence and further there is no effect of moisture absorption or oxidative deterioration even in feeding to melt processing apparatus.

To transfer a polymer polymerized by a polymerization method of the present invention to a molding machine in molten state for molding, it is necessary to transfer a polymer drawn out from the polymerization reactor to a molding machine at temperature as low as possible and in a short time within the range not to solidify the polymer. "Molten state" here means that a polymer is in flowing state by melting under heating and has viscosity of about 500,000 Pa·s or lower.

Temperature to transfer and mold a polymer produced by polymerization to a molding machine is not lower than a temperature lower than crystal melting point by 10° C. to stably transfer without significantly increasing viscosity or solidification. By setting the temperature at not higher than a temperature higher than crystal melting point by 60° C., a high quality molded product with low level coloring or generation of volatile impurities by thermal decomposition can be produced. A temperature higher than crystal melting point by 0 to 40° C. is preferable, (a temperature higher than crystal melting point by 0 to 30° C.) is more preferable, a temperature higher than crystal melting point by 0 to 20° C. is further preferable and a temperature higher than crystal melting point by 1 to 15° C. is particularly preferable. These temperatures can be attained by suitably controlling temperature of a heater or a jacket covering the transfer pipeline, the transfer pump and a molding machine.

Time required till molding is preferably within 40 minutes, more preferably within 20 minutes and particularly preferably within 10 minutes. Naturally, shorter time is better. "Time required till molding" here is the period from the time when a molten polymer comes out from the discharge pump of the polymerization reactor to the time when it is cooled to not higher than the crystallization temperature of said polymer as a molded product or pellets. When a molten polymer is transferring continuously in a pipeline, etc., average time calculated from the volume of the pipeline, etc., and flow rate can be used. When this time varies, it is necessary to be set within the time described above.

As for a molding machine, a commercial molding machine using pellets as raw material can be used in initial state or after modification. In particular, in the present invention, because a polymer in molten state is directly fed from the polymerization reactor, pellet plasticization mechanism such as a melt plasticization screw can be simplified or omitted, which was essential to a molding machine using conventional pellets as raw material. As the result, molding can be executed under conditions of low shear heat generation by plasticization mechanism, by which a far high quality molded product can be produced.

Molding can be executed using one molding machine or two or more molding machines of the same or different type. Because a molding machine is operated intermittently, when multiple molding machines are used, to make flow amount of a polymer drawn out from the polymerization reactor constant, such a method is also preferably used that flow amount is averaged by shifting a molding cycle of multiple molding machines by given quantity.

When a polymer continuously drawn out from the polymerization reactor is introduced to a molding machine, operated intermittently, it is also a preferable method that an accumulator is separately installed in midway to accumulate a molten polymer. Such a method is further preferable that a molding machine and the accumulator are synchronized to reduce residence of a molten polymer.

Such a method is also preferable that by installing a resin nozzle or an extruder or a pelletizer separately from a molding machine, a molded product and pellets are simultaneously produced.

As a preferable example of the present invention, a polymerization case of PET is then explained based on drawings.

Embodiments of preferable combination to attain a method of the present invention are shown in FIG. 1 and others, however, the present invention is by no means limited to these.

The reference numerals of the drawings are as follows:

| | |
|---|---|
| 1 | Transfer pump |
| 2 | Prepolymer feeding port |
| 3 | Porous plate |
| 4 | Inspection window |
| 5 | Supporting substrate |
| 6 | Inert gas feeding port |
| 7 | Exhaust port for reduced pressure |
| 8 | Discharge pump |
| 9 | Distributor |
| 10 | Molding machines A |
| 11 | Molding machines B |
| 12 | Molding machines C |
| 13 | Pelletizer |
| 14 | Transfer pump |
| 15 | System for output pressure detection and output control of the discharge pump |
| 16 | System for level detection and output control of the transfer pump |
| 17 | Polymerization reactor |
| 18 | System for output pressure detection and opening degree control of a polymer return valve or back pressure valve |
| 19 | Switching valve |
| 20 | Distributor |
| 21 | Stirring tank type polymerization reactor |
| 22 | Stirring blade |
| 23 | Polymer return pipeline |
| N1 | Transfer pump |
| N2 | Prepolymer feeding port |
| N3 | Porous plate |
| N5 | Supporting substrate |
| N6 | Inert gas feeding port |
| N7 | Exhaust port for reduced pressure |
| N8 | Discharge and transfer pump |
| N10 | Inert gas absorption apparatus |
| P1 | Esterification reactor |
| P2 | Stirring blade |
| P3 | Exhaust port for reduced pressure |
| P4 | Transfer pump |
| P5 | First stirring tank type polymerization reactor |
| P6 | Stirring blade |
| P7 | Exhaust port for reduced pressure |
| P8 | Transfer pump |
| P9 | Second stirring tank type polymerization reactor |
| P10 | Stirring blade |
| P11 | Exhaust port for reduced pressure |
| E1 | First transesterification reactor |
| E2 | Stirring blade |
| E3 | Exhaust port for reduced pressure |
| E4 | Transfer pump |
| E5 | Second transesterification reactor |
| E6 | Stirring blade |
| E7 | Exhaust port for reduced pressure |
| E8 | Transfer pump |
| E9 | First stirring tank type polymerization reactor |
| E10 | Stirring blade |
| E11 | Exhaust port for reduced pressure |
| E12 | Transfer pump |
| E13 | Horizontal type stirring polymerization reactor |
| E14 | Stirring blade |
| E15 | Exhaust port for reduced pressure |

In FIG. 1, the prepolymer A of a polycondensation polymer such as PET is fed to the polymerization reactor from the prepolymer feeding port (2) via the transfer pump (1) with a molecular weight regulator B, if necessary, and introduced inside the polymerization reactor by passing the porous plate (3) and drops along the supporting substrate (5). Inside the polymerization reactor (17) is controlled under specified degree of reduced pressure and by-produced ethylene glycol, etc., and the like or inert gas such as nitrogen introduced from the inert gas feeding port (6), if necessary, is discharged from an exhaust port for reduced pressure (7). A polymer produced by polymerization is discharged by the discharge pump (8). Output of the discharge pump (8) is controlled by a system (15) for the output pressure detection and output control of the discharge pump. A polymer drawn out, after continuously discharged by the discharge pump (8), is fed to molding machines A to C (10 to 12) by a transport pipeline and the distributor (9) and molded. Three or more molding machines can also be connected.

A polymer polymerized while dropping along the supporting substrate (5) is drawn out from a discharge port by the discharge pump (8) after dropping to the lower part of the polymerization reactor (17), and in this case, it is preferable to make the amount accumulated at the lower part of the polymerization reactor as small as possible and as constant as possible. A method for controlling the accumulated amount includes adjustment of liquid feed amount of the transfer pump (1) and the discharge pump (8) by monitoring the accumulated amount through the inspection window (4) or with the level gauge such as a capacitance type one. As a preferable example, a method for adjustment by installing the transfer pump (14) connected to the pelletizer (13) along with a molding machine and by transferring to the pelletizer so as to control residence time of a polymer at the bottom of the polymerization reactor (17) to selected time is shown in FIG. 1.

The transfer pump (1 and 14), the polymerization reactor (17), the discharge pump (8), the transfer pipeline and the distributor (9), the molding machines A to C (10 to 12), the pelletizer (13), etc., are heated by a heater or a jacket and kept warm.

The polymerization reactor used in the present invention can be equipped with a stirrer, etc., at the bottom of the polymerization reactor, however, it is not especially necessary. Therefore, it is possible to eliminate a rotational drive unit at the polymerization reactor itself, which ensures polymerization in good seal condition even under high vacuum. Because the rotational drive unit of the discharge pump is covered with a resin to discharge, such a reactor is sealed far better than the polymerization reactor with a rotational drive unit.

A method of the present invention can also be executed by a single unit of the polymerization reactor. It may be executed by two or more units of the polymerization reactors. Furthermore, a single unit of the polymerization reactor may be partitioned in vertical or horizontal type to make multi-step polymerization reactors.

In the present invention, a step for increasing molecular weight from the prepolymer of a polycondensation polymer such as PET to a polycondensation polymer such as PET with high degree of polymerization, that is a target polymer, can also be executed by polymerization while dropping all of the prepolymer from the holes of the porous plate along the supporting substrate. However, a method by combination with other polymerization methods, for example, a stirring tank type polymerization reactor and a horizontal type stirring polymerization reactor is preferable.

The horizontal stirring polymerization reactor includes for example, the polymerization reactor described in chapter 4 of "Research Report by Reaction Engineering Research Association: Reactive Processing, Part 2" (Society of Polymer Science, Japan; 1992), such as a screw type, an independent blade type, a single axial type and a twin axial type.

As the stirring tank type polymerization reactor, any of stirring tanks described, for example, in chapter 11 of "Chemical Apparatus Handbook (Edited by Society of Chemical Engineers, Japan; 1989) can be used. Tank shape is not especially limited. A cylinder type of vertical or horizontal type is usually used. Shape of stirring blade is also not especially limited. For example, a paddle type, an anchor type, a turbine type, a screw type, a ribbon type and a double blade type are used.

A step for producing the prepolymer from raw material may be executed by either a batch system or a continuous system. In case of a batch system, all amounts of raw material or reaction products are fed to the reactor to be subjected to a reaction for specified hours, and then all amount of the reaction products are transferred to the next reactor. While, in case of a continuous system, raw material or reaction products are continuously fed to each reactor and reaction products can be continuously discharged. A continuous system is preferable to produce a homogeneous and high quality polycondensation polymer such as PET and the molded product thereof in large quantity.

The molding machine in the present invention means apparatus to make a molten state resin into specified shape, including such as an extrusion molding machine, an injection molding machine and a blow molding machine. The molded product obtained by the molding machine includes such as bottles, preform for bottles, films, sheets, tubes, rods, fibers and injection molded products in various shapes. The present invention is suitable, in particular, to produce preform for drinking bottles among them. It is because drinking bottles are strongly required to have not only superior strength and transparency but also have reduced amount of low molecular weight volatile impurities to affect taste or odor of the contents, represented by acetaldehyde in case of PET, along with good productivity and producible in low cost.

FIG. 2 is a typical example of the polymerization reactor to attain a method of the present invention, in case of using an inert gas absorption apparatus. The prepolymer A of a polycondensation polymer such as PET is fed to the inert gas absorption apparatus (N10) from the prepolymer feeding port (N2) via the transfer pump (N1), and introduced inside the inert gas absorption apparatus by passing the porous plate (N3) and drops along the supporting substrate (N5). Inside the inert gas absorption apparatus is controlled under specified degree of reduced pressure by the exhaust port for reduced pressure (N7) and the prepolymer A absorbs, while dropping, inert gas such as nitrogen introduced from inert gas feeding port (N6). The prepolymer A is fed from feeding port (2) to the polymerization reactor (17) via the discharge and transfer pump (N8), introduced inside the polymerization reactor by passing through the porous plate (3) and drops along the supporting substrate (5). Inside the polymerization reactor is controlled under specified degree of reduced pressure and by-produced ethylene glycol, etc. is discharged from the exhaust port for reduced pressure (7). A polymer produced by polymerization is discharged by the discharge pump (8) to the discharge port via the distributor (9). The polymerization reactor (17), etc. are heated by a heater or a jacket and kept warm.

A polymer produced by polymerization is continuously discharged from the discharge pump (8) and then fed to the molding machines A to C (10 to 12) by the transfer pipeline and the distributor (9) and molded. Three or more molding machines can be connected.

As a preferable example to maintain accurate and constant resin residence time at the upper stream of the molding machine and thus produce the molded product with always constant quality and weight, FIG. 2 shows an apparatus installing a transfer pump (14) connected to the pelletizer (13) along with the molding machines. In the apparatus, a resin is transferred to pelletizer (13) so as to control polymer melt residence time at the bottom of the polymerization reactor to selected time.

The transfer pump (1 and 14), the inert gas absorption apparatus (N10), the polymerization reactor (17), the discharge pump (8), the transfer pipeline and the distributor (9), the molding machines A to C (10 to 12), the pelletizer (13), etc. are heated by a heater or a jacket and kept warm.

FIG. 3 shows an embodiment of preferable combination to practice a method of the present invention, by controlling the transfer pressure by means of returning a part of a resin discharged to the bottom of the polymerization reactor while maintaining the output amount of the discharge pump constant. However, the present invention is by no means limited to these.

The prepolymer A of a polycondensation polymer such as PET is fed to the polymerization reactor from the prepolymer feeding port (2) via the transfer pump (1), and introduced inside the polymerization reactor (17) by passing the porous plate (3) and drops along the supporting substrate (5). Inside the polymerization reactor (17) is controlled under specified degree of reduced pressure and by-produced ethylene glycol, etc. or inert gas such as nitrogen introduced from the inert gas feeding port (6), if necessary, is discharged from the exhaust port for reduced pressure (7). A polymer produced by polymerization is discharged from the discharge pump (8). Output amount of the discharge pump (8) is controlled to a value selected from 1.0 to 100 times the feed amount of the prepolymer A.

A polymer produced by polymerization is continuously discharged from the discharge pump (8) and then fed to the molding machines A to C (10 to 12) by a transfer pipeline and the distributor (9) and molded. Three or more molding machines can be connected.

A pipeline to return a resin to the bottom of the polymerization reactor is installed in addition to the molding machine, after the discharge pump (8) and the system for output pressure detection and opening degree control of a polymer return valve or the back pressure valve (18) is set at said pipeline. The opening degree of the system for output pressure detection and opening degree control of a polymer return valve or the back pressure valve (18) is controlled so as to maintain the transfer pressure to the molding machine at arbitrary pressure.

A polymer polymerized while dropping along the supporting substrate is drawn out from a discharge port by the discharge pump (8) after dropping to the lower part of the polymerization reactor. In this case, it is preferable to make the amount accumulated at the lower part of the polymerization reactor as small as possible and as constant as possible. A method for controlling the accumulated amount includes adjustment of liquid feed amount of the transfer pump (14) and the discharge pump (8) by monitoring the accumulated amount through the inspection window (4) or with the level gauge such as a capacitance type.

As a preferable example, FIG. 3 shows an apparatus installing a transfer pump (14) connected to the pelletizer (13) along with the molding machines. In the apparatus, a resin is transferred to pelletizer (13) so as to control polymer melt residence time at the bottom of the polymerization reactor to selected time.

The transfer pump (1 and 14), the polymerization reactor (17), the discharge pump (8), the transfer pipeline and the distributor (9), the system for output pressure detection and opening degree control of a polymer return valve or the back pressure valve (18), the molding machines A to C (10 to 12), the pelletizer (13), etc. are heated by a heater or a jacket and kept warm.

FIG. 4 shows a typical example of the polymerization reactor to attain a method of the present invention, in case of using the inert gas absorption apparatus, by controlling the transfer pressure by means of returning a part of a resin discharged to the bottom of the polymerization reactor while maintaining the output amount of the discharge pump constant.

FIG. 5 shows an example of a preferable embodiment of a method for installing at least two discharge pumps at the bottom of the polymerization reactor, however, the present invention is by no means limited to these.

The prepolymer A of a polycondensation polymer such as PET is fed to the polymerization reactor (17) through the prepolymer feeding port (2) via the transfer pump (1) from the polymerization reactor, and introduced inside the polymerization reactor by passing the porous plate (3) and drops along the supporting substrate (5). Inside the polymerization reactor is controlled under specified degree of reduced pressure and by-produced ethylene glycol, etc. or inert gas such as nitrogen introduced from the inert gas feeding port (6), if necessary, is discharged from the exhaust port for reduced pressure (7). A polymer produced by polymerization is discharged by the multiple discharge pumps (8) via the distributor (9).

A polymer produced by polymerization is continuously discharged by each of the discharge pumps (8) and then fed to the molding machines A to C (10 to 12) or pelletizer (13) by a transport pipeline installed with the switching valve (19) and molded. Three or more molding machines and pelletizers can be connected.

A polymer polymerized while dropping along the supporting substrate is drawn out from the discharge port by the discharge pump after dropping to the lower part of the polymerization reactor. In this case, it is preferable to make the amount accumulated at the lower part of the polymerization reactor as small as possible and as constant as possible. A method for controlling the accumulated amount includes adjustment of liquid feed amount of the transfer pump (1) and the discharge pump (8) by monitoring the accumulated amount through the inspection window (4) or with the level gauge such as a capacitance type.

The transfer pump (1 and 14), the polymerization reactor (17), the discharge pump (8), the transfer pipeline and the distributor (9), the switching valve (19), the molding machines A to C (10 to 12), the pelletizer (13), etc. are heated by a heater or a jacket and kept warm.

FIG. 6 shows a specific example of the polymerization reactor to attain a method of the present invention by installing at least two discharge pumps at the bottom of the polymerization reactor, in case of using the inert gas absorption apparatus.

FIG. 9 shows a preferable embodiment example, in case of PET polymerization, for re-circulation of "excess polymers". However, the present invention is by no means limited to this.

FIG. 9 is a specific example of PET polymerization and molding using high purity terephthalic acid as raw material. Raw material S, that is high purity terephthalic acid and ethylene glycol, generates bis(hydroxyethyl terephthalate) and the oligomer composed of only several monomers, that is early stage condensates of PET, in the esterification reactor (P1). The products are transferred to the first stirring tank type polymerization reactor (P5) by the transfer pump (P4) and generate the prepolymer with limiting viscosity [η] in the range of 0.04 to 2 dl/g by a polycondensation reaction. When the prepolymer with desired limiting viscosity [η] cannot be obtained only in the first stirring tank type polymerization reactor (P5), the prepolymer is further transferred to the second stirring tank type polymerization reactor (P9) by the transfer pump (P8) and subjected to further polycondensation to obtain the prepolymer with desired limiting viscosity [η].

The prepolymer A of PET thus produced is fed to the polymerization reactor (17) through the prepolymer feeding port (2) via the transfer pump (1), and introduced inside the polymerization reactor by passing the porous plate (3) and drops along the supporting substrate (5). Inside the polymerization reactor is controlled under specified degree of reduced pressure and by-produced ethylene glycol, etc. or inert gas such as nitrogen introduced from inert gas feeding port (6), if necessary, is discharged from the exhaust port for reduced pressure (7). A polymer produced by polymerization is discharged by the discharge pump (8) and fed to the molding machines A to C (10 to 12) by the transfer pipeline and the distributor (9). Three or more molding machines can be connected. A PET resin polymerized in excess amount over the amount to be processed by the molding machine is returned through the polymer return pipeline (23) to the first stirring tank type polymerization reactor (P5) by the transfer pump (14) and can be re-circulated.

A polymer polymerized while dropping along the supporting substrate (5) is drawn out from the discharge port by the discharge pump (8) driven by the motor M after dropping to the lower part of the polymerization reactor (17). In this case, it is preferable to make the amount accumulated at the lower part of the polymerization reactor (17) as small as possible and as constant as possible. A method for controlling the accumulated amount includes adjustment of liquid feed amount of the transfer pump (14) by monitoring the accumulated amount through the inspection window (4) or with the level gauge such as a capacitance type.

The transfer pump (1 and 14), the polymerization reactor (5) itself, the first stirring tank type polymerization reactor (P5), the second stirring tank type the polymerization reactor (P9), the transfer pump (P4), the discharge pump (8), the transport pipeline and the distributor (9), the polymer return pipeline (23), the molding machines A to C (10 to 12), etc., are heated by a heater or a jacket and kept warm.

FIG. 10 is a specific example of PET polymerization and molding using dimethyl terephthalate as raw material. Raw material S, that is dimethyl terephthalate and ethylene glycol, generates bis(hydroxyethyl terephthalate) and the oligomer composed of only several monomers, that is the early stage condensates of PET, in the first transesterification reactor (E1) and the second transesterification reactor (E5). The products are transferred to the first stirring tank type polymerization reactor (E9) by the transfer pump (E8) and generate the prepolymer with limiting viscosity [η] in the range of 0.04 to 2 dl/g by a polycondensation reaction. When the prepolymer with desired limiting viscosity [η] cannot be obtained only in the first stirring tank type polymerization reactor (E9), the prepolymer is further transferred to a horizontal type stirring polymerization reactor (E13) by the transfer pump (E12) and subjected to further polycondensation to obtain the prepolymer with desired limiting viscosity [η]. The prepolymer A of PET thus produced is fed, similarly as in FIG. 9, to the polymerization reactor (17) through the prepolymer feeding port (2) via the transfer pump (1), and introduced inside the polymerization reactor by passing the porous plate (3) and drops along the supporting substrate (5). Inside the polymerization reactor (17) is controlled under specified degree of reduced pressure and by-produced ethylene glycol, etc., or inert gas such as nitrogen introduced from inert gas feeding port (6), if necessary, is discharged from the exhaust port for reduced pressure (7). A polymer produced by polymerization is discharged by the discharge pump (8) driven by the motor M and fed to the molding machines A to C (10 to 12) via the transfer pipeline and the distributor (9), and molded. Three or more molding machines can be connected. A PET resin polymerized in excess amount over the amount to be processed by the molding machine is returned to the first stirring tank type polymerization reactor (E9) via the polymer returning pipeline (23) by the transfer pump (14) and can be re-circulated.

FIG. 11 shows a preferable embodiment example, in PET polymerization, in case of using a molecular weight regulator B. However, the present invention is by no means limited to this. In this Fig., the prepolymer A of PET is fed to the polymerization reactor (17) from a production step of the prepolymer by the transfer pump (1) through a pipeline. The molecular weight regulator B is mixed in the feeding pipeline and molecular weight of the prepolymer A is changed by reaction between the prepolymer A and the molecular weight regulator B in the pipeline. The prepolymer A is fed to the polymerization reactor (17) through the prepolymer feeding port (2) and introduced inside the polymerization reactor (17) by passing through the holes of the porous plate (3) and drops along the supporting substrate (5).

Inside the polymerization reactor (17) is controlled under specified degree of reduced pressure and by-produced ethylene glycol, etc., or inert gas such as nitrogen introduced from inert gas feeding port (6), if necessary is discharged from the exhaust port for reduced pressure (7).

A polymer produced by polymerization is drawn out from the discharge port (9) by the discharge pump (8) after dropping to the lower part of the polymerization reactor. In this case, it is preferable to make the amount accumulated at the lower part of the polymerization reactor (17) as small as possible and as constant as possible. A method for controlling the accumulated amount includes adjustment of liquid feed amount of the transfer pump (14) and the discharge pump (8) by monitoring the accumulated amount through then inspection window (4) or with the level gauge such as a capacitance type.

The transfer pump (1 and 14), the polymerization reactor (17), the discharge pump (8), the transfer pipeline, etc. are heated by a heater or a jacket and kept warm.

A polycondensation polymer discharged from the polymerization reactor by the discharge pump (8), after adjustment of quality such as degree of polymerization and production amount by the molecular weight regulator B, is transferred to the molding machines A to C (10 to 12) or the pelletizer (13) installed adjacent to the polymerization reactor as illustrated and can be molded or pelletized.

EXAMPLES

The present invention is explained based on Examples.

Major measurement values in the Examples were determined by the following methods.

(1) Limiting Viscosity [η]

Limiting viscosity [η] was determined in accordance with the following equation by extrapolation of ratio $\eta_{sp}/C$ between relative viscosity $\eta_{sp}$ in o-chlorophenol at 35° C. using Ostwald viscosimeter and concentration C (g/100 ml) to zero concentration:

$$[\eta] = \lim_{C \to 0}(\eta_{sp}/C) \qquad \text{[Expression 1]}$$

Degree of polymerization of the prepolymer can be evaluated by the above limiting viscosity [η], more generally used instead of melt viscosity in case of PET.

For example, melt viscosity at 260° C. of the prepolymer of a PET resin with limiting viscosity [η] of 0.15 dl/g is about 60 poise and melt viscosity at 260° C. of the prepolymer of a PET resin with limiting viscosity [η] of 1.2 dl/g is about 100000 poise.

(2) Crystal Melting Point

Crystal melting point was determined from peak value of an endothermic peak derived from crystal melting, measured under the following conditions using "Pyris 1 DSC" (input compensation type differential scanning calorimeter) from Perkin Elmer Co., Ltd. The peak value was determined using analysis software attached.

Measurement temperature: 0 to 300° C.

Temperature rising rate: 10° C./min.

(3) Amount of Carboxyl Groups at the Polymer Terminal

It was determined in accordance with the following equation by dissolving 1 g of a sample into 25 ml of benzyl alcohol, and then adding 25 ml of chloroform to titrate with a $\frac{1}{50}$ N alcohol solution of potassium, hydroxide, based on titration value $V_A$ (ml) and blank value $V_0$ without PET:

Amount of Carboxyl Groups at the Polymer Terminal (meq/kg)=$(V_A-V_0) \times 20$ (4) Resin Hue (L Value, b Value)

It was evaluated in accordance with a JIS Z8730 method using analysis software attached, by dissolving 1.5 g of a sample into 10 g of 1,1,1,3,3,3-hexafluoro-2-propanol, and analyzing by a transmittance method using UV-2500PC (UV-visible ray spectrometer) from Shimadzu Corp.

(5) Content of Impurities

A sample was finely cut and frost crushed for 3 to 10 minutes under cooling in liquid nitrogen using 6700 freezer mill (frost crusher) from SPEX Co., Ltd., to adjust to particles with 850 to 1000 μm size. Said powder of 1 g was put in a glass ampoule tube with 2 ml of water and sealed after purging with nitrogen and heated at 130° C. for 90 minutes to extract impurities such as acetaldehyde. The ample was opened after cooling to analyze under the following conditions using GC-14B (gas chromatograph) from Shimadzu Corp.

Column: VOCOL (60 m×0.25 mmφ×film thickness of 1.5 μm)

Temperature conditions: Hold at 35° C. for 10 min., followed by increase at 5° C./min. up to 100° C. and then 20° C./min. from 100 to 220° C.

Temperature at the injection port: 220° C.

Injection method: a split method (split ratio=1:30)

1.5 μL injection

Measurement method: FID method

Example 1

Using apparatus shown in FIG. 1, the prepolymer of PET with limiting viscosity [η] of 0.48 dl/g, amount of carboxyl groups at the polymer terminal of 32 meq/kg and crystal melting point of 256° C. was fed into the polymerization reactor (17) through the prepolymer feeding port (2) by the transfer pump (1), discharged at the rate of 15 g/minutes per each hole of the porous plate (3) in molten state at 265° C., then polymerized under reduced pressure of 65 Pa while dropping along the supporting substrate at the same ambient temperature in discharging, drawn out from the polymerization reactor (17) by the discharging pump (8) and subjected to preform molding to blow molding in succession at molding temperature of 280° C. using a biaxially stretching blow molding machine (SBIII-100H-15 from Aoki Technical Laboratory, Inc.) as the molding machine A (10). Dumbbell pieces were molded at molding temperature of 280° C. using an injection molding machine (MJEC-10 from MODERN MACHINERY CO., LTD) as the molding machine B (11). The pelletizer C, instead of a molding machine, was installed as the molding machine C (12).

Output of the discharge pump (8) at the bottom of the polymerization reactor (17) was controlled by detection of the output pressure at the down stream of the discharge pump (8) and using a system (15) for output pressure detection and output control of the discharge pump, so as to be maintained at 20 MPa (absolute pressure) during molding. By the above results, variation of output pressure during molding was always controlled within ±20%.

The porous plate with thickness of 50 mm and 14 holes with diameter of 1 mm, each 7 holes with 10 mm space being linearly aligned on each of 2 aligned lines in parallel with distance of 70 mm was used. The supporting substrate vertically attached with wires having diameter of 2 mm and length of 8 m at the vicinity of each hole was used, wherein said wires were orthogonally installed with other wires having diameter of 2 mm and length of 100 mm in 100 mm space to make lattice-like. As material of the supporting substrate, stainless steal was used.

As the prepolymer, such one was used as produced by the addition of 0.04% by weight of diantimony trioxide and trimethyl phosphate of 100 ppm as weight ratio of phosphorous element. Residence time in the polymerization reactor was 70 minutes. Residence time determined by the amount of a polymer inside the polymerization reactor divided by the feed amount was used. There caused little fierce foaming of the prepolymer discharged from the porous plate during polymerization, resulting in very small contamination at the nozzle surface or wall surface. Inclusion of much quantity of foam by a dropping resin and behavior of resin rolling down along the supporting substrate in circular foam were observed.

First of all, a polymer transfer pipeline toward the transfer pump (14) in FIG. 1 was closed to feed the resin only to the molding machines A to C (10 to 12) for continuous molding of molded products over 5 hours. Molding cycles of the molding machine A (10) and the molding machine B (11), in particular, timing of each weighing step were not adjusted in any way and thus molding by the molding machine A (10) and the molding machine B (11) was executed independently. The molding machine C (12) was also operated under constant conditions without adjustment from initial set values.

Yield, shape and quality of the molded products produced by the molding machines A to C (10 to 12) were evaluated every one hour and confirmed that the molded products, with stable quality could be obtained over 5 hours. Results are shown in Table 1.

Example 2

Polymerization and molding were carried out under the same conditions as in Example 1, except that the output pressure during molding was controlled so as to be maintained at 5 MPa (absolute pressure) by a system (15) for output pressure detection and output control of the discharge pump. Results are shown in Table 2.

Example 3

Polymerization and molding were carried out under the same conditions as in Example 1, except that the output pressure during molding was controlled so as to be maintained at 2 MPa (absolute pressure) by a system (15) for output pressure detection and output control of the discharge pump. Results are shown in Table 3.

Example 4

Polymerization and molding were carried out under the same conditions as in Example 1 and the polymer transfer pipeline toward the transfer pump (14) in FIG. 1 was opened and the amount of polymer accumulated at the bottom of the polymerization reactor was detected by the level detector installed at the bottom of the polymerization reactor (17). Residence time at the bottom of the polymerization reactor was controlled so as to be maintained at 2 minutes by a system (16) for level detection and output control of the transfer pump and the transfer pump (14) whose output was controlled by the system. A polymer discharged from the transfer pump (14) was pelletized by the pelletizer (13). By the above results, variation of residence time at the bottom of the polymerization reactor (17) during molding was always controlled within ±20%.

A resin was thus fed to the molding machines A to C (10 to 12) and the pelletizer (13) for continuous molding of the molded products over 5 hours. After 1 hour, envisioning accident of a molding machine, the molding machine B (11) was stopped and molding was continued only by the molding machines A, C (10, 12) and the pelletizer (13).

Yield, shape and quality of the molded products produced by each molding machine were evaluated every one hour and confirmed that the molded products with stable quality could be obtained over 5 hours, in particular, even after stopping the molding machine B (11) after 1 hour, by using other e molding machines. Results are shown in Table 4.

Comparative Example 1

Polymerization and molding were carried out under the same conditions as in Example 1. However, control of the discharge pump by a system (15) for output pressure detection and output control for the discharge pump was not carried out and the output amount was kept at 12.6 kg/h. This resulted in always large variation of the output pressure during molding in the range of 0 to 220 MPa (absolute pressure).

A resin was thus fed only to the molding machines A to C (10 to 12) for continuous molding of molded products over 5 hours.

Yield, shape and quality of the molded products produced by each molding machine were evaluated every one hour and found low quality of each molded product and the variation was also large. Results are shown in Table 5.

Comparative Example 2

Polymerization and molding were carried out under the same conditions as in Example 1, except that the output pressure during molding was controlled so as to be maintained at 0.05 MPa (absolute pressure) by a system (15) for output pressure detection and output control of the discharge pump. However, in this case, feed of a molten resin could not be completed within weighing period of the molding machine and continuation of molding was impossible.

Example 5

Using apparatus shown in FIG. 3, the prepolymer of PET with limiting viscosity [η] of 0.46 dl/g, amount of carboxyl groups at the polymer terminal of 32 meq/kg and crystal melting point of 256° C. was fed at the amount of 12.6 kg/hr into the polymerization reactor (17) through the prepolymer feeding port (2) by the transfer pump (1), discharged at the rate of 15 g/minutes per each hole of the porous plate (3) in molten state at 265° C., then polymerized under reduced pressure of 65 Pa while dropping along the supporting substrate at the same ambient temperature in discharging, drawn out from the polymerization reactor (17) by the discharging pump (8) and subjected to preform molding to blow molding successively at molding temperature of 280° C. using a biaxially stretching blow molding machine (SBIII-100H-15 from Aoki Technical Laboratory, Inc.) as the molding machine A (10).

Dumbbell pieces were molded at molding temperature of 280° C. using an injection molding machine (MJEC-10 from MODERN MACHINERY CO., LTD.) as the molding machine B (11).

The pelletizer, instead of a molding machine, was installed as the molding machine C (12). Furthermore, a pipeline was installed to return a polymer from midpoint of a pipeline connecting the discharge pump (8) and the transfer pump (14), to the bottom of the polymerization reactor (17). To this pipeline to return a polymer was installed a system for output pressure detection and opening degree control of a polymer return valve, to control flow amount.

Output amount of the discharge pump (8) at the bottom of the polymerization reactor was kept at 20.0 kg/h. Also, by detecting pressure at downstream of the discharge pump (8) so as to be maintained at 20 MPa (absolute pressure) during molding, opening degree of a polymer return valve, installed at a pipeline to return a polymer, was controlled by a system for output pressure detection and opening degree control of a polymer return valve (18). By the above results, variation of the output pressure during molding was always controlled within ±20%.

The porous plate with thickness of 50 mm and 14 holes with diameter of 1 mm, each 7 holes with 10 mm space being linearly aligned on each of 2 aligned lines in parallel with distance of 70 mm was used. The supporting substrate vertically attached with wires having diameter of 2 mm and length of 8 m at the vicinity of each hole was used wherein said wires were orthogonally installed with other wires having diameter of 2 mm and length of 100 mm in 100 mm space to make lattice-like. As material of the supporting substrate, stainless steel was used.

As the prepolymer, such one was used as produced by the addition of 0.04% by weight of diantimony trioxide and trimethyl phosphate of 100 ppm as weight ratio of phosphorous element. Residence time in the polymerization reactor was 70 minutes. Residence time determined by the amount of a polymer inside the polymerization reactor (17) divided by the feed amount was used. There caused little fierce foaming of the prepolymer discharged from the porous plate during polymerization, resulting in very small contamination at the nozzle surface or wall surface. Inclusion of much quantity of foam by a dropping resin and behavior of resin rolling down along the supporting substrate in circular foam were observed.

First of all, the transfer pump (14) in FIG. 3 was closed to feed the resin to only the molding machines A to C (10 to 12) for continuous molding of molded products over 5 hours. Molding cycles of the molding machine A (10) and the molding machine B (11), in particular, timing of each weighing step were not adjusted in any way and thus molding by the molding machine A (10) and the molding machine B (11) was executed independently. The molding machine C (12) was also operated under constant conditions without adjustment from initial values.

Yield, shape and quality of the molded products produced by each molding machine were evaluated every one hour and confirmed that the molded products with stable quality could be obtained over 5 hours. Results are shown in Table 6.

Example 6

Polymerization and molding were carried out under the same conditions as in Example 5. In this case, the amount of a polymer accumulated at the bottom of the polymerization reactor (17) was detected by the level detector installed at the bottom of the polymerization reactor (17). The residence time at the bottom of the polymerization reactor (17) was controlled so as to be maintained at 2 minutes by a system (16) for level detection and output control of the transfer pump and, by the transfer pump (14) whose output was controlled by the system. A polymer discharged from the transfer pump (14) was pelletized by the pelletizer (13). By the above results, variation of residence time at the bottom of the polymerization reactor during molding was always controlled within ±20%.

A resin was thus fed to the molding machines A to C (10 to 12) and the pelletizer (13) for continuous production of the molded products over 5 hours. In this case, after 1 hour, envisioning accident of a molding machine, the molding machine B (11) was stopped and molding was continued only by the molding machines A, C (10, 12) and the pelletizer (13).

Yield, shape and quality of the molded products produced by each molding machine were evaluated every one hour and confirmed that the molded products with stable quality could be obtained over 5 hours, in particular, even after stopping the molding machine B (11) after 1 hour, by using other molding machines. Results are shown in Table 7.

Comparative Example 3

Polymerization and molding were carried out under the same conditions as in Example 5. However, output amount of the discharge pump (8) was kept at 12.6 kg/h and a polymer transfer pipeline toward the transfer pump (14) in FIG. 1 was closed to feed the resin only to the molding machines A to C (10 to 12). This resulted in always large variation of the output pressure during molding in the range of 0 to 220 MPa (absolute pressure).

Thus the molded products were continuously produced over 5 hours. Yield, shape and quality of the molded products produced by each molding machine were evaluated every one hour and found low quality of each molded product and the variation was also large. Results are shown in Table 8.

Example 7

Using apparatus shown in FIG. 5, the prepolymer of PET with limiting viscosity [η] of 0.48 dl/g, amount of carboxyl groups at the polymer terminal of 32 meq/kg and crystal melting point of 256° C. was fed in the polymerization reactor (17) through the prepolymer feeding port (2) by the transfer pump (1), discharged at the rate of 15 g/minutes per each hole of the porous plate (3) in molten state at 265° C., then polymerized under reduced pressure of 65 Pa while dropping along the supporting substrate at the same ambient temperature in discharging, drawn out from the polymerization reactor (17) by three discharging pumps (8) installed at the bottom of the polymerization reactor and subjected to preform molding to blow molding successively at molding temperature of 280° C. using a biaxially stretching blow molding machine (SBIII-100H-15 from Aoki Technical Laboratory, Inc.) as the molding machine A (10).

During stopping the molding machine A (10), a resin was arranged to be fed to the pelletizer (13) by the switching valve (19). Dumbbell pieces were molded at molding temperature of 280° C. using an injection molding machine (MJEC-10 from MODERN MACHINERY CO., LTD) as the molding machine B (11). During the stop of the molding machine B (11), a resin was arranged to be fed to the pelletizer (13) by the switching valve (19). The molding machine C (12) was not connected. Pellets were produced by installing only the pelletizer (13).

The porous plate (3) with thickness of 50 mm and 14 holes with diameter of 1 mm, each 7 holes with 10 mm space being linearly aligned on each of 2 aligned lines in parallel with distance of 70 mm was used. The supporting substrate (5) vertically attached thereonwith wires having diameter of 2 mm and length of 8 m at the vicinity of each hole was used, wherein said wires were orthogonally installed with other wires having diameter of 2 mm and length of 100 mm in 100 mm space to make lattice-like. As material of the supporting substrate, stainless steel was used. The discharge pump was operated so that a polymer was little accumulated at the bottom of the polymerization reactor (17) by monitoring through the inspection window (4).

As the prepolymer, such one was used as produced by the addition of 0.04% by weight of diantimony trioxide and trimethyl phosphate of 100 ppm as weigh ratio of phosphorous element. Residence time in the polymerization reactor was 70 minutes. Residence time determined by the amount of a polymer inside the polymerization reactor divided by the feed amount was used. There caused little fierce foaming of the prepolymer discharged from the porous plate (3) during polymerization, resulting in contamination at the nozzle surface or wall surface. Inclusion of much quantity of foam by a dropping resin and behavior of resin rolling down along the supporting substrate in circular foam were observed.

First of all, by an switching valve, a resin was fed to the molding machine A (10), the molding machine B (11) and the pelletizer (13) and by adjustment of the output amount of the discharge pump at each 5.0 kg/h, 4.5 kg/h and 3.1 kg/h, the molded products and pellets were continuously produced over 5 hours. Yield, shape and quality of the molded products produced by each molding machine were evaluated every one hour. In accordance with the present invention, high quality molded products and pellets, having high degree of polymerization, good hue and low content of acetaldehyde could be produced. Results are shown in Table 9.

Comparative Example 4

Using apparatus shown in FIG. 7, polymerization was carried out similarly as in Example 7. A polymer was drawn out from the polymerization reactor (17) by one discharge pump (8) installed at the bottom of the polymerization reactor (17) and distributed by the distributor (20). A biaxially stretching blow molding machine (SBIII-100H-15 from Aoki Technical Laboratory, Inc.) as the molding machine A (10), an injection molding machine (MJEC-10 from MODERN MACHINERY CO., LTD) as the molding machine B (11) and the pelletizer (13) were connected by a pipeline with the same shape, and inner volume to be able to simultaneously mold the molded products.

Then by adjustment of the output amount of the discharge pump (8) at 126 kg/h, the molded products were continuously produced over 5 hours. Yield, shape and quality of each of molded products were evaluated every one hour. By a method for distribution of a resin by such a distributor, quality and weight of the molded products were varied in time course, which lowered product value of the molded products. Results are shown in Table 10.

Comparative Example 5

Using apparatus shown in FIG. 8, the prepolymer of PET with limiting viscosity [η] of 0.48 dl/g, amount of carboxyl groups at the polymer terminal of 32 meq/kg and crystal melting point of 256° C. was fed into the stirring tank type polymerization reactor (21) through the prepolymer feeding port (2) by the transfer pump (1), polymerized under the conditions of polymerization temperature at 285° C., reduced pressure of 50 Pa, residence time of 60 minutes and polymerization rate of 12.6 kg/h, drawn out from the polymerization reactor (17) by three discharging pumps (8) installed at the bottom of the polymerization reactor (21) and subjected to simultaneously producing the molded products and pellets using a biaxially stretching blow molding machine (SBIII-100H-15 from Aoki Technical Laboratory, Inc.) as the molding machine A (10), an injection molding machine (MJEC-10 from MODERN MACHINERY CO., LTD) as the molding machine B (11) and the pelletizer (12) and adjusting the output amount of the output pumps at 5.0 kg/h, 4.5 kg/h and 3.1 kg/h.

The molded products and pellets were continuously produced over 5 hours. Yield, shape and quality of the molded products were evaluated every one hour. When such a conventional stirring tank type polymerization reactor is used, quality such as degree of polymerization, hue and content of acetaldehyde was insufficient and these quality and weight of the molded products largely varied in time course. Thus, the product value of such molded products is low. Results are shown in Table 11.

Example 8

Using apparatus shown in FIG. 9 and using high purity terephthalic acid and EG as raw material, PET was polymerized at 10.0 kg/h in average by a continuous polymerization method. Using a vertical type stirring polymerization reactor having paddle-like stirring blades, as the esterification reactor (P1) and the first and the second stirring tank type the polymerization reactor (P5, P9), polymerization was carried out under reduced pressure while dropping the prepolymer along the supporting substrate protruded from holes of the porous plate (3) in the final polymerization reactor (17).

Polymerization was carried out by continuously charging of a slurry-like mixture of terephthalic acid and EG in molar ratio of 1:1.2, into the esterification reactor under the conditions shown in Table 12. In this case, 0.04% by weight of diantimony trioxide and trimethyl phosphate of 20 ppm as weigh ratio of phosphorous element were added to the prepolymer obtained in the first stirring type polymerization reactor. Diantimony trioxide and trimethyl phosphate were added each as a 2% by weight EG solution. Polymerization results are shown in Table 12. The prepolymer fed into the final polymerization reactor had limiting viscosity [η] of 0.47 dl/g and crystal melting point of 255° C.

Said prepolymer was fed into the polymerization reactor (17) through the prepolymer feeding port (2) by the transfer pump (1), discharged at the rate of 10 g/minutes per each hole of the porous plate (3) in molten state at 260° C., then polymerized under reduced pressure of 65 Pa while dropping along the supporting substrate (5) at the same ambient temperature in discharging, drawn out by discharging pumps (8) and then via transfer pipeline and the distributor (9) subjected to preform molding to blow molding successively at molding temperature of 280° C. using a biaxially stretching blow molding machine (SBIII-100H-15 from Aoki Technical Laboratory, Inc.) as the molding machine A (10). Dumbbell pieces were molded using an injection molding machine (MJEC-10 from MODERN MACHINERY CO., LTD.) as the molding machine B (11). Continuous molding was carried out using only the molding machine A (10) and the molding machine B (11) without connecting to an injection molding machine C (12). Output of the discharge pump at the bottom of the polymerization reactor (17) was controlled so as to be maintained at 20 MPa (absolute pressure) during molding, by detecting the output pressure at the downstream of the discharge pump and by a system (15) for output pressure detection and output control of the discharge pump. By the above results, variation of the output pressure during molding was always controlled within ±20%. In addition, by installing the polymer return pipeline (23) for connecting the distributor (9) and the first stirring tank type polymerization reactor (P5), an excess PET resin polymerized over treatment amount by the molding machine was re-circulated by the transfer pump (14).

The porous plate with thickness of 50 mm and 14 holes having diameter of 1 mm, each 7 holes with 10 mm space being linearly aligned on each of 2 aligned lines in parallel with distance of 70 mm was used. The supporting substrate (5) vertically attached thereon with wires having diameter of 2 mm and length of 8 m each at the vicinity of each hole was used, wherein said wires were orthogonally installed with other wires having diameter of 2 mm and length of 100 mm in 100 mm space to make lattice-like. As material of the supporting substrate, stainless steel was used.

The discharge pump was operated so that a polymer was little accumulated at the bottom of the polymerization reactor by monitoring through the inspection window. Residence time in the polymerization reactor in this case was 65 minutes. Residence time determined by the amount of a polymer inside the polymerization reactor (17) divided by the feed amount was used. There caused little fierce foaming of a prepolymer discharged from the porous plate in the polymerization reactor (17), resulting in very small contamination at the nozzle surface or wall surface. Inclusion of much quantity of foam by a dropping resin and behavior of resin rolling down along the supporting substrate in circular foam were observed.

First of all, PET was stably and continuously polymerized at 10.0 kg/h under the above-described conditions, then subjected to continuous molding at 5 kg/h by an injection molding machine A and at 4.5 kg/h by an injection molding machine B. At the same time, an excess polymer of 0.5 kg/h was re-circulated to the first stirring tank type polymerization reactor (P5) by the polymer returning pipeline and also the amount of raw material continuous charged into the esterification reactor was reduced to 95% of the level at the initial reaction start stage. After setting such state (named start up state), polymerization and injection molding was carried out continuously over 24 hours. During this period, quality of the molded products produced by each molding machine was evaluated every one hour and found that each of molded products with stable quality could be obtained over 24 hours. Results are shown in Table 13.

Example 9

After setting start up state to conditions as in Example 8, by envisioning accident of a molding machine, the injection molding machine B was stopped and an excess polymer of 5.0 kg/h was re-circulated to the first stirring tank type polymerization reactor (P5) by the polymer returning pipeline and also the amount of raw material continuously charged into the esterification reactor was reduced to 50% of the level at the initial reaction start stage. After setting such state, polymerization and injection molding was carried out continuously over 24 hours using only the injection molding machine A. During this period, quality of the molded product produced was evaluated every one hour and found that each of the molded products with stable quality could be obtained over 24 hours. Results are shown in Table 14.

TABLE 1

Example 1: Variation of a molded product during 5 hours (discharge pressure of 20 MPa)

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.0 | 0.76 ± 0.0 | 24.60 ± 0.05 | 99.6 ± 0.1 0.17 ± 0.1 | 11.4 ± 0.5 |
| Molded product B | Dumbbell | 4.5 ± 0.0 | 0.76 ± 0.0 | 78.00 ± 0.05 | 99.4 ± 0.1 0.18 ± 0.1 | 14.1 ± 0.6 |
| Pellet C | Pellet | 3.1 ± 0.0 | 0.77 ± 0.0 | 0.050 ± 0.003 | 99.8 ± 0.1 0.15 ± 0.1 | 3.6 ± 0.3 |

TABLE 2

Example 2: Variation of a molded product during 5 hours (discharge pressure of 5 MPa)

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.0 | 0.76 ± 0.0 | 24.60 ± 0.11 | 99.6 ± 0.1 0.18 ± 0.1 | 11.4 ± 0.5 |
| Molded product B | Dumbbell | 4.5 ± 0.0 | 0.76 ± 0.0 | 78.00 ± 0.09 | 99.4 ± 0.1 0.18 ± 0.2 | 14.1 ± 0.6 |
| Pellet C | Pellet | 3.1 ± 0.1 | 0.77 ± 0.1 | 0.050 ± 0.014 | 99.8 ± 0.1 0.16 ± 0.1 | 3.9 ± 0.6 |

TABLE 3

Example 3: Variation of a molded product during 5 hours (discharge pressure of 2 MPa)

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.0 | 0.76 ± 0.0 | 24.60 ± 0.23 | 99.6 ± 0.2 0.19 ± 0.2 | 11.8 ± 1.5 |
| Molded product B | Dumbbell | 4.5 ± 0.1 | 0.76 ± 0.1 | 77.99 ± 0.14 | 99.4 ± 0.2 0.19 ± 0.3 | 14.5 ± 1.9 |
| Pellet C | Pellet | 3.1 ± 0.1 | 0.77 ± 0.1 | 0.051 ± 0.022 | 99.8 ± 0.1 0.16 ± 0.2 | 4.2 ± 1.5 |

TABLE 4

Example 4: Variation of a molded product before and after stop of the molding machine B

| | Shape | Yield (kg/h) | Limiting viscosity (dl/g) | Weight (g) | Hue (L value, b value) | Acetaldehyde content (ppm) |
|---|---|---|---|---|---|---|
| Molded product A (Hollow product) | Before B stops | 5.0 | 0.76 | 24.61 | 99.6, 0.16 | 11.7 |
| | 4 hr after stop | 5.0 ± 0.0 | 0.76 ± 0.0 | 24.60 ± 0.05 | 99.6 ± 0.1, 0.17 ± 0.1 | 11.4 ± 0.5 |
| Pellet C | Before B stops | 3.1 | 0.77 | 0.052 | 99.7, 0.15 | 3.7 |
| | 4 hr after stop | 3.1 ± 0.0 | 0.77 ± 0.0 | 0.050 ± 0.003 | 99.8 ± 0.1, 0.15 ± 0.1 | 3.6 ± 0.3 |

TABLE 5

Comparative Example 1: Variation of a molded product during 5 hours (No adjustment of discharge pressure)

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.2 | 0.76 ± 0.2 | 24.52 ± 0.90 | 98.6 ± 0.3, 0.29 ± 0.3 | 17.4 ± 2.4 |
| Molded product B | Dumbbell | 4.5 ± 0.2 | 0.76 ± 0.2 | 77.84 ± 0.20 | 97.9 ± 0.3, 0.31 ± 0.4 | 20.1 ± 3.3 |
| Pellet C | Pellet | 3.1 ± 0.2 | 0.77 ± 0.1 | 0.053 ± 0.044 | 97.8 ± 0.4, 0.34 ± 0.3 | 7.6 ± 3.2 |

TABLE 6

Example 5: Variation of a molded product during 5 hours (discharge pressure of 20 MPa)

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.0 | 0.75 ± 0.0 | 24.60 ± 0.05 | 99.6 ± 0.1, 0.17 ± 0.1 | 10.5 ± 0.5 |
| Molded product B | Dumbbell | 4.5 ± 0.0 | 0.75 ± 0.0 | 78.00 ± 0.05 | 99.4 ± 0.1, 0.18 ± 0.1 | 13.2 ± 0.6 |
| Pellet C | Pellet | 3.1 ± 0.0 | 0.76 ± 0.0 | 0.050 ± 0.003 | 99.8 ± 0.1, 0.15 ± 0.1 | 3.5 ± 0.3 |

TABLE 7

Example 6: Variation of a molded product before and after stop of the molding machine B

| | Shape | Yield (kg/h) | Limiting viscosity (dl/g) | Weight (g) | Hue (L value, b value) | Acetaldehyde content (ppm) |
|---|---|---|---|---|---|---|
| Molded product A (Hollow product) | Before B stops | 5.0 | 0.75 | 24.61 | 99.6, 0.16 | 10.4 |
| | 4 hr after stop | 5.0 ± 0.0 | 0.75 ± 0.0 | 24.60 ± 0.05 | 99.6 ± 0.1, 0.17 ± 0.1 | 10.5 ± 0.5 |
| Pellet C | Before B stops | 3.1 | 0.76 | 0.052 | 99.7, 0.15 | 3.4 |
| | 4 hr after stop | 3.1 ± 0.0 | 0.76 ± 0.0 | 0.050 ± 0.003 | 99.8 ± 0.1, 0.15 ± 0.1 | 3.5 ± 0.3 |

TABLE 8

Comparative Example 3: Variation of a molded product during 5 hours

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.2 | 0.75 ± 0.2 | 24.52 ± 0.90 | 98.6 ± 0.3, 0.30 ± 0.3 | 16.4 ± 2.2 |
| Molded product B | Dumbbell | 4.5 ± 0.2 | 0.75 ± 0.2 | 77.84 ± 0.20 | 97.8 ± 0.3, 0.30 ± 0.4 | 20.3 ± 3.7 |
| Pellet C | Pellet | 3.1 ± 0.2 | 0.76 ± 0.1 | 0.053 ± 0.044 | 97.9 ± 0.4, 0.34 ± 0.3 | 7.2 ± 3.2 |

TABLE 9

Example 7: Variation of a molded product during 5 hours

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.0 | 0.75 ± 0.0 | 24.60 ± 0.04 | 99.6 ± 0.1, 0.17 ± 0.1 | 10.5 ± 0.5 |
| Molded product B | Dumbbell | 4.5 ± 0.0 | 0.75 ± 0.0 | 78.00 ± 0.04 | 99.4 ± 0.1, 0.18 ± 0.1 | 13.2 ± 0.6 |
| Pellet C | Pellet | 3.1 ± 0.0 | 0.76 ± 0.0 | 0.050 ± 0.003 | 99.8 ± 0.1, 0.15 ± 0.1 | 3.5 ± 0.3 |

TABLE 10

Comparative Example 4: Variation of a molded product during 5 hours

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.2 | 0.75 ± 0.2 | 24.50 ± 1.0 | 98.6 ± 0.2, 0.27 ± 0.3 | 13.4 ± 3.2 |
| Molded product B | Dumbbell | 4.5 ± 0.2 | 0.75 ± 0.2 | 77.79 ± 0.40 | 98.3 ± 0.2, 0.26 ± 0.2 | 17.6 ± 3.9 |
| Pellet C | Pellet | 3.1 ± 0.2 | 0.76 ± 0.1 | 0.053 ± 0.048 | 98.4 ± 0.2, 0.21 ± 0.3 | 6.2 ± 3.8 |

TABLE 11

Comparative Example 5: Variation of a molded product during 5 hours

| | Shape | Yield (kg/h) | Limiting viscosity (dl/g) | Weight (g) | Hue (L value, b value) | Acetaldehyde content (ppm) |
|---|---|---|---|---|---|---|
| Molded product A | Hollow product | 5.0 ± 0.2 | 0.62 ± 0.3 | 24.59 ± 1.3 | 94.3 ± 0.8 0.77 ± 0.6 | 56.4 ± 7.2 |
| Molded product B | Dumb-bell | 4.5 ± 0.1 | 0.62 ± 0.4 | 78.01 ± 0.30 | 95.5 ± 0.9 0.98 ± 0.5 | 50.1 ± 6.9 |
| Pellet C | Pellet | 3.1 ± 0.2 | 0.62 ± 0.3 | 0.052 ± 0.010 | 94.7 ± 1.0 0.82 ± 0.5 | 48.1 ± 8.3 |

TABLE 12

Example 8

| | Temp. (°C.) | Residence time (min.) | Vacuum degree (Pa) | Limiting viscosity (dl/g) |
|---|---|---|---|---|
| Esterification reactor | 260 | 180 | normal | — |
| 1st stirring tank type polymerization reactor | 280 | 80 | 20000 | 0.20 |
| 2nd stirring tank type polymerization reactor | 285 | 60 | 100 | 0.47 |

TABLE 13

Example 8: Variation of a molded product during 24 hours

| | Shape | Limiting viscosity (dl/g) | Weight (g) | Hue (L value, b value) | Acetaldehyde content (ppm) |
|---|---|---|---|---|---|
| Molded product A (Hollow product) | Start up state | 0.75 | 24.61 | 99.6 0.16 | 10.4 |
| | 1-12 hr after start | 0.75 ± 0.0 | 24.60 ± 0.05 | 99.6 ± 0.1 0.17 ± 0.1 | 10.5 ± 0.5 |
| | 13-24 hr after start | 0.75 ± 0.0 | 24.60 ± 0.05 | 99.6 ± 0.1 0.17 ± 0.1 | 10.5 ± 0.5 |
| Molded product B (dumbbell) | Start up state | 0.76 | 0.052 | 99.7, 0.15 | 3.4 |
| | 1-12 hr after start | 0.76 ± 0.0 | 0.050 ± 0.003 | 99.8 ± 0.1 0.15 ± 0.1 | 3.5 ± 0.3 |
| | 13-24 hr after start | 0.76 ± 0.0 | 0.050 ± 0.003 | 99.8 ± 0.1 0.15 ± 0.1 | 3.5 ± 0.3 |

TABLE 14

Example 9: Variation of a molded product during 24 hours

| | Shape | Limiting viscosity (dl/g) | Weight (g) | Hue (L value, b value) | Acetaldehyde content (ppm) |
|---|---|---|---|---|---|
| Molded product A (Hollow product) | Start up state | 0.75 | 24.61 | 99.6, 0.16 | 10.4 |
| | 1-12 hr after start | 0.75 ± 0.0 | 24.60 ± 0.05 | 99.6 ± 0.1, 0.17 ± 0.1 | 10.5 ± 0.5 |
| | 13-24 hr after start | 0.75 ± 0.0 | 24.60 ± 0.05 | 99.6 ± 0.2, 0.17 ± 0.1 | 10.5 ± 0.5 |

INDUSTRIAL APPLICABILITY

The present invention provides a method for producing a high quality molded product in low cost by transferring a resin continuously polymerized by a melt polycondensation reaction, in molten state as it is, which is easy to adjust quality and feed amount of a molten resin fed in a molding machine and also easy to adjust them even in case of mutual variation of "resin producing rate" and "resin molding rate and can produce a molded product with stable quality and weight in time course.

Figure 1:
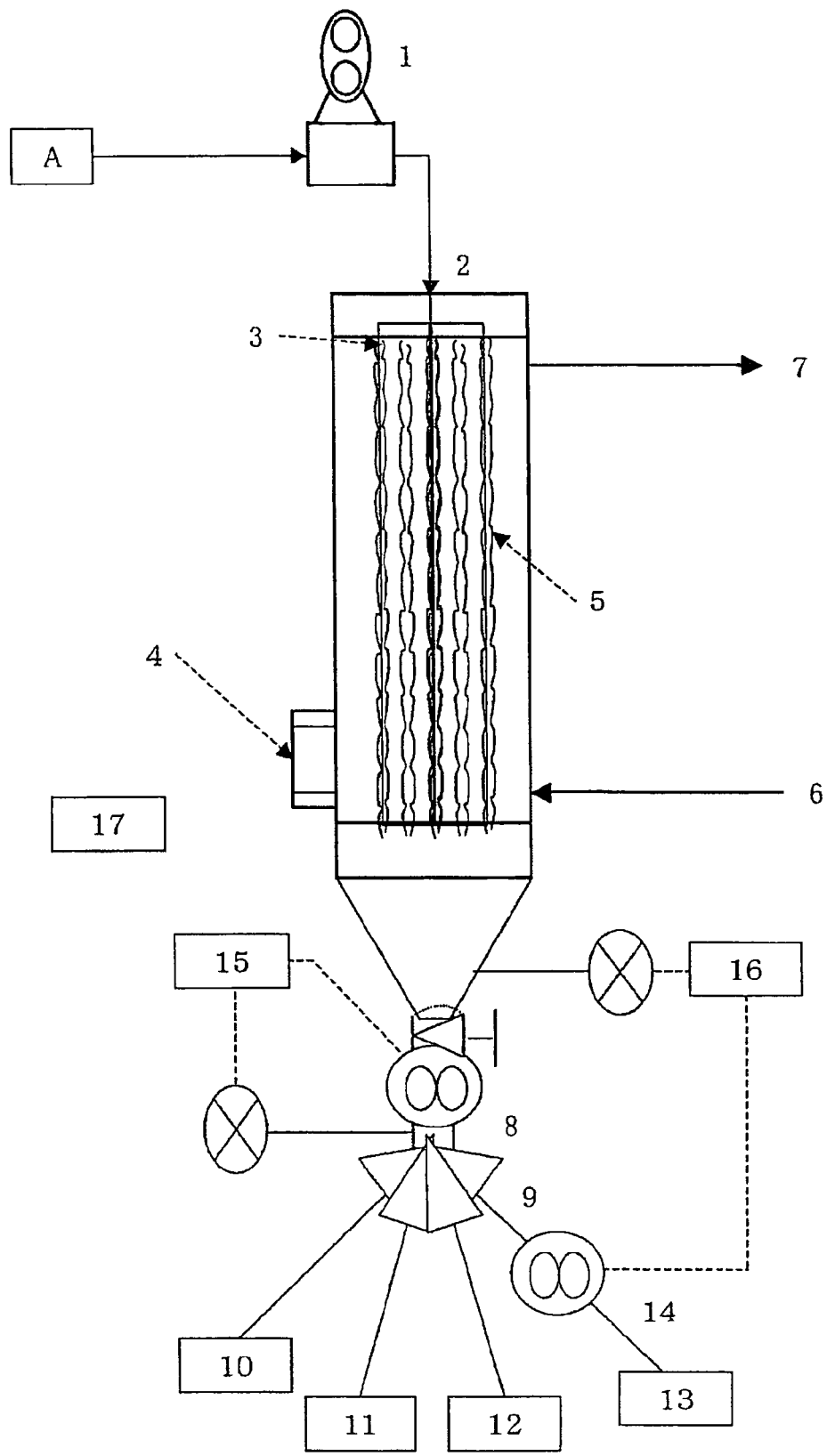
FIG. 1 A schematic drawing showing an example of the polymerization reactor and molding apparatus used in the present invention.
Figure 2:
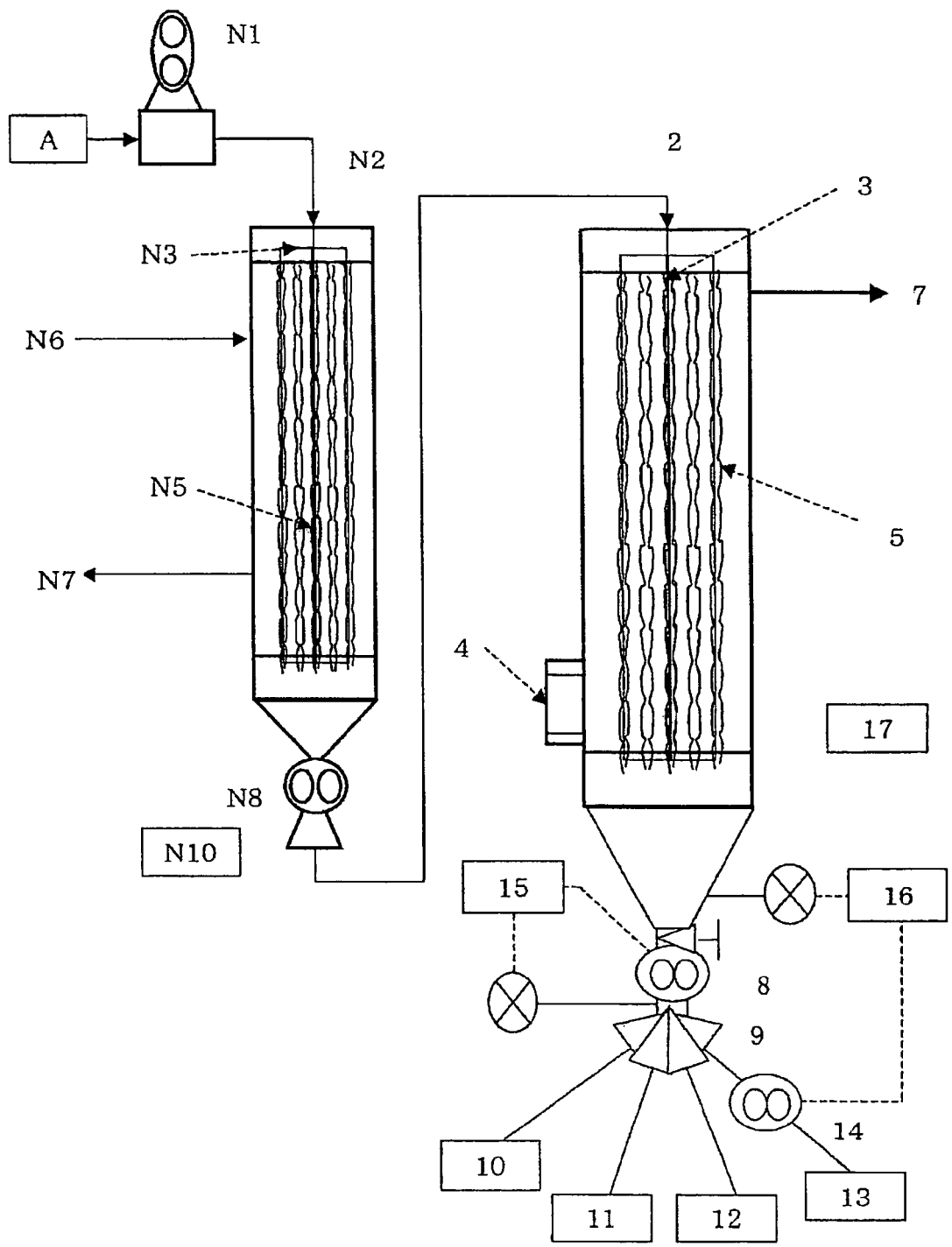
FIG. 2 A schematic drawing showing inert gas absorption apparatus, the polymerization reactor and molding apparatus used in the present invention.
Figure 3:
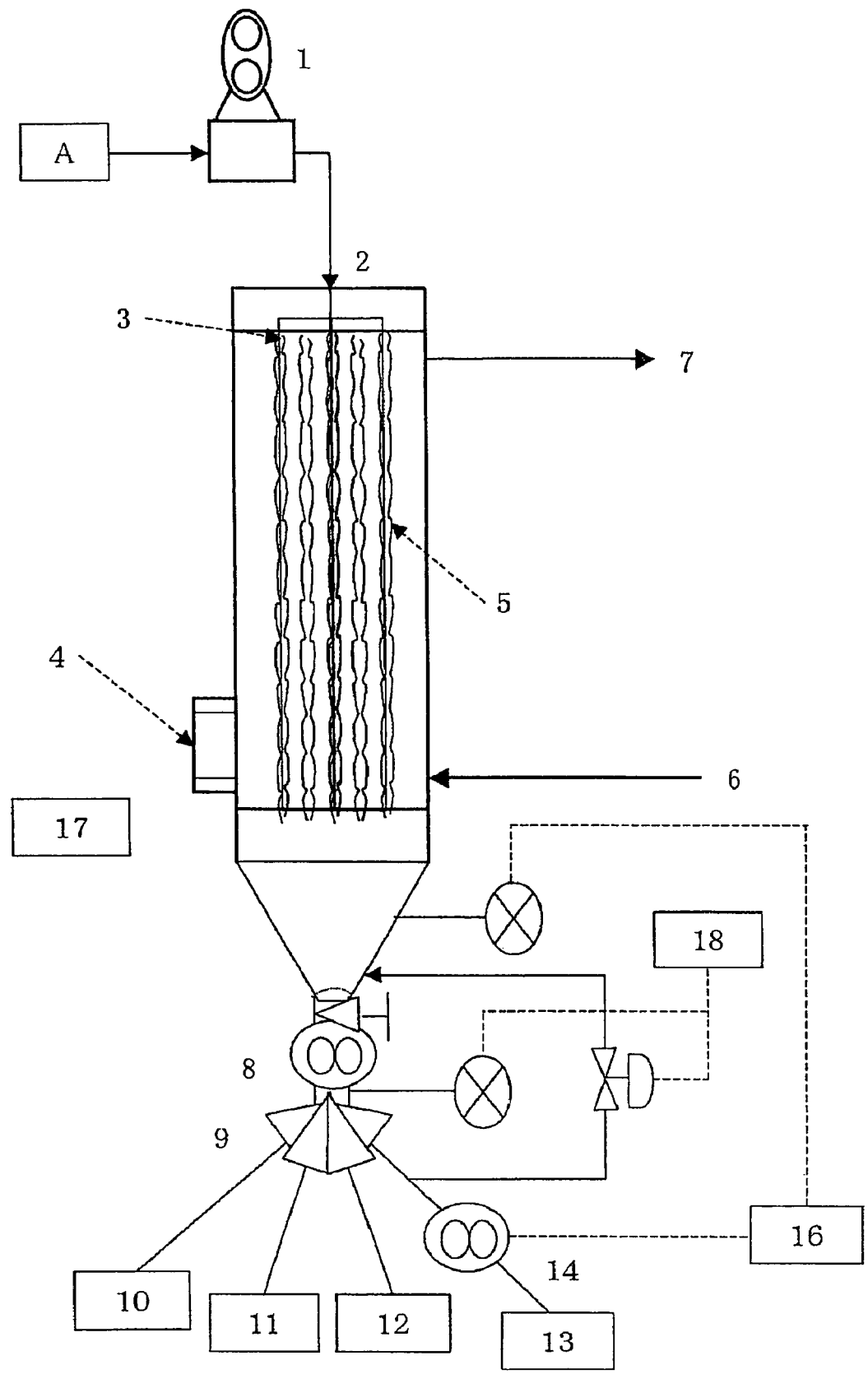
FIG. 3 A schematic drawing showing an example of the polymerization reactor and molding apparatus used in the present invention.
Figure 4:
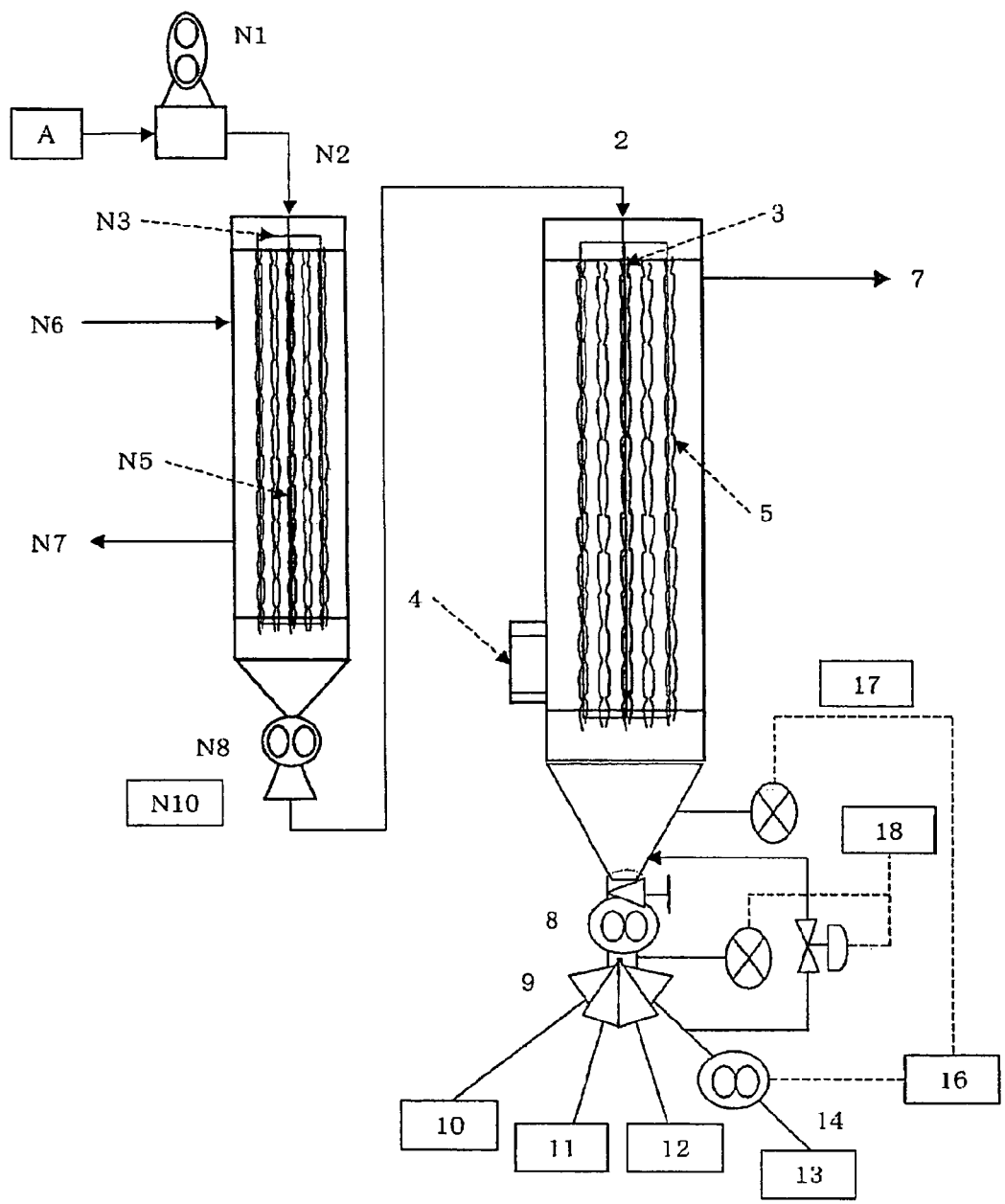
FIG. 4 A schematic drawing showing inert gas absorption apparatus, the polymerization reactor and molding apparatus used in the present invention FIG. 5 A schematic drawing showing an example of the polymerization reactor and molding apparatus used in the present invention.
Figure 5:
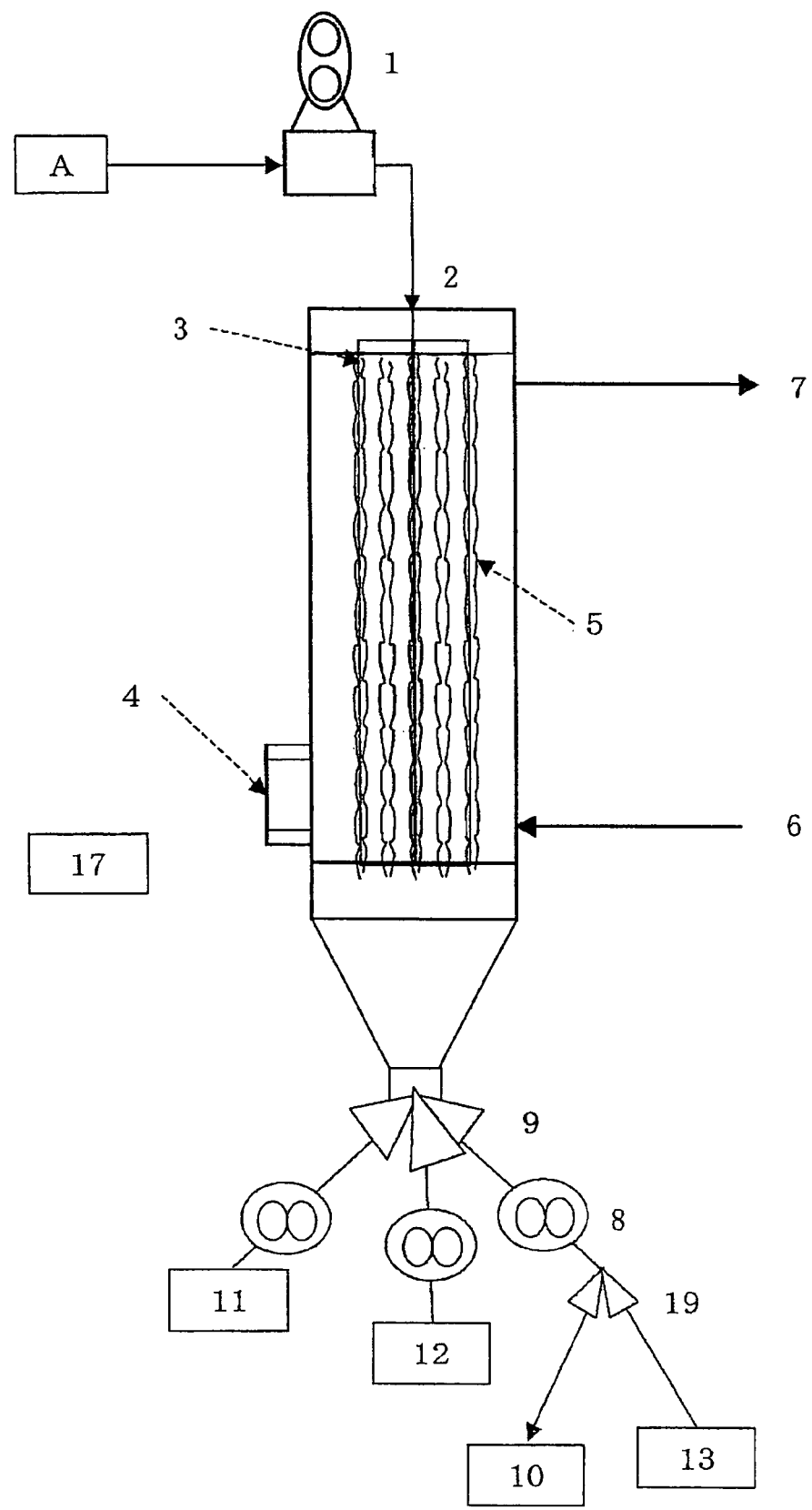
Figure 6:
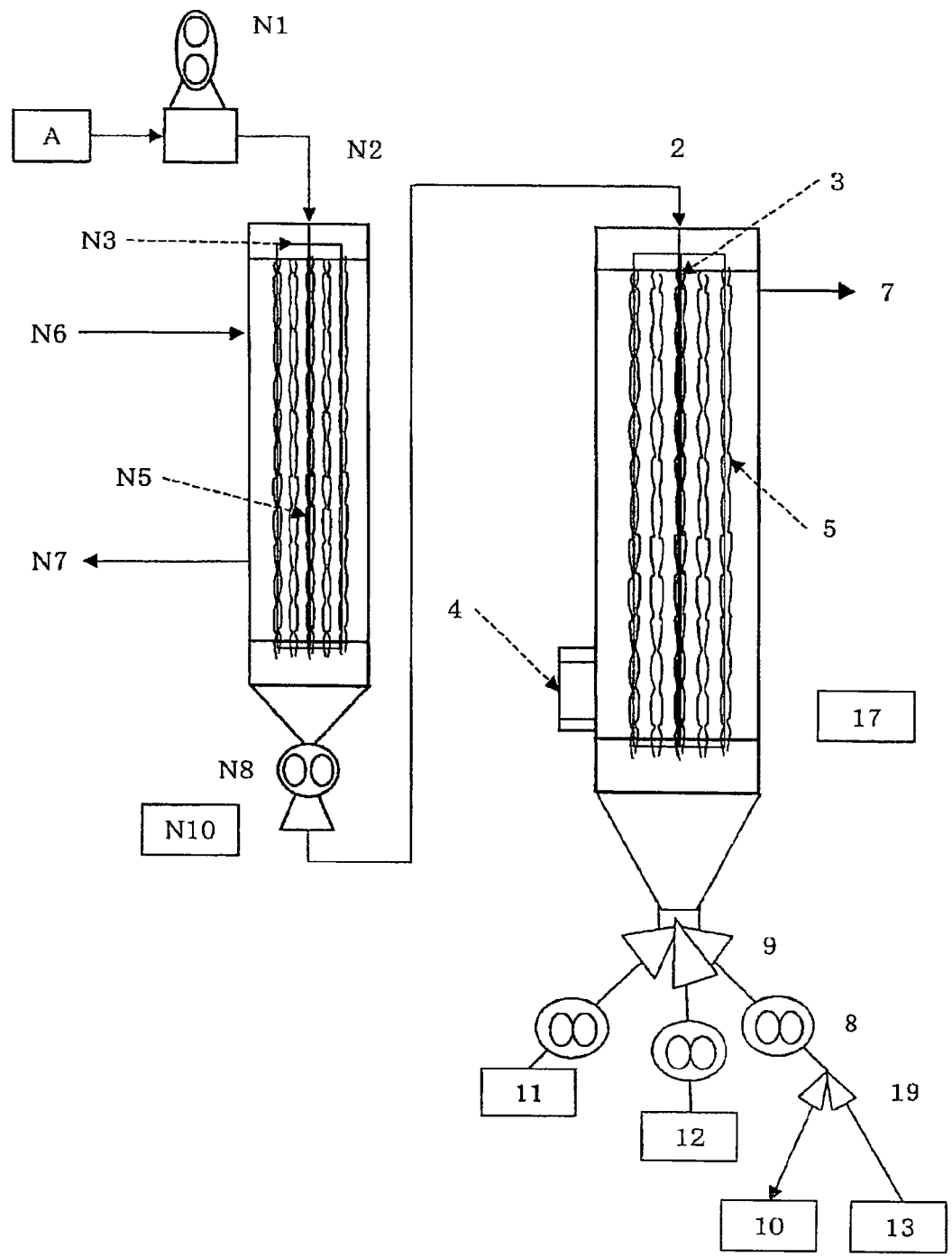
FIG. 6 A schematic drawing showing inert gas absorption apparatus, the polymerization reactor and molding apparatus used in the present invention.
Figure 7:
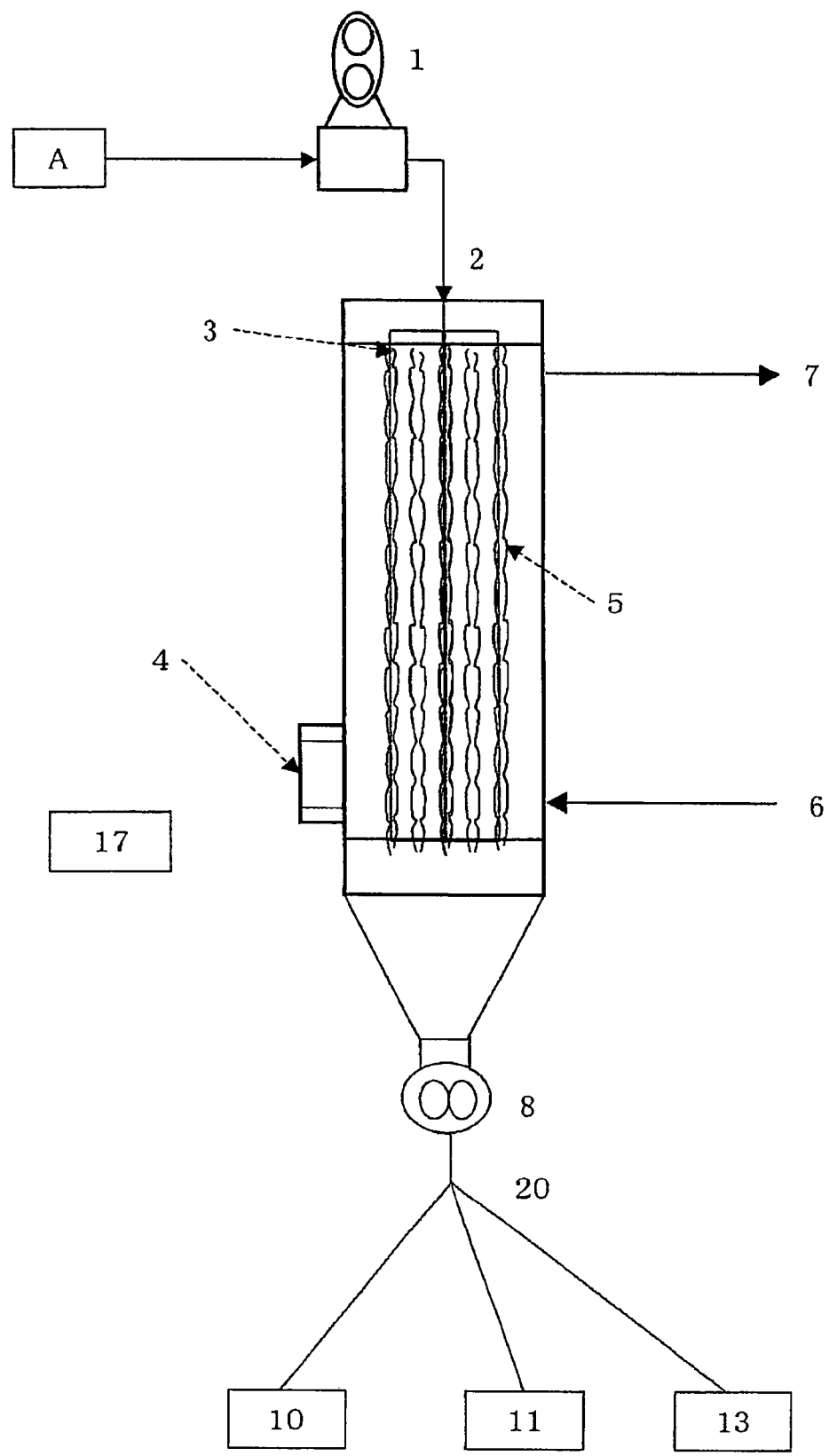
FIG. 7 A schematic drawing showing an example of polymerization and molding apparatus used in Comparative Example.
Figure 8:
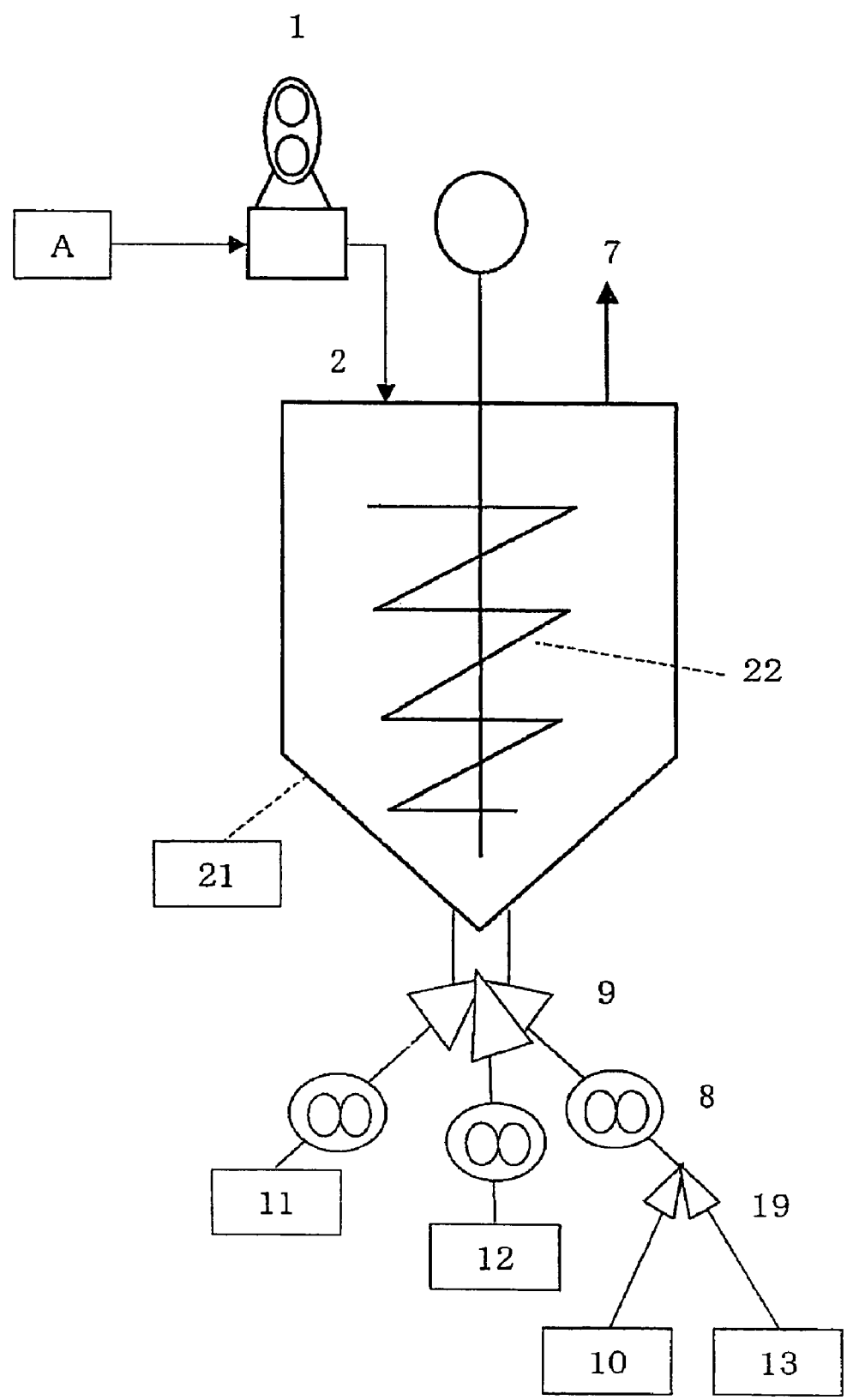
FIG. 8 A schematic drawing showing an example of polymerization and molding apparatus used in Comparative Example.
Figure 9:
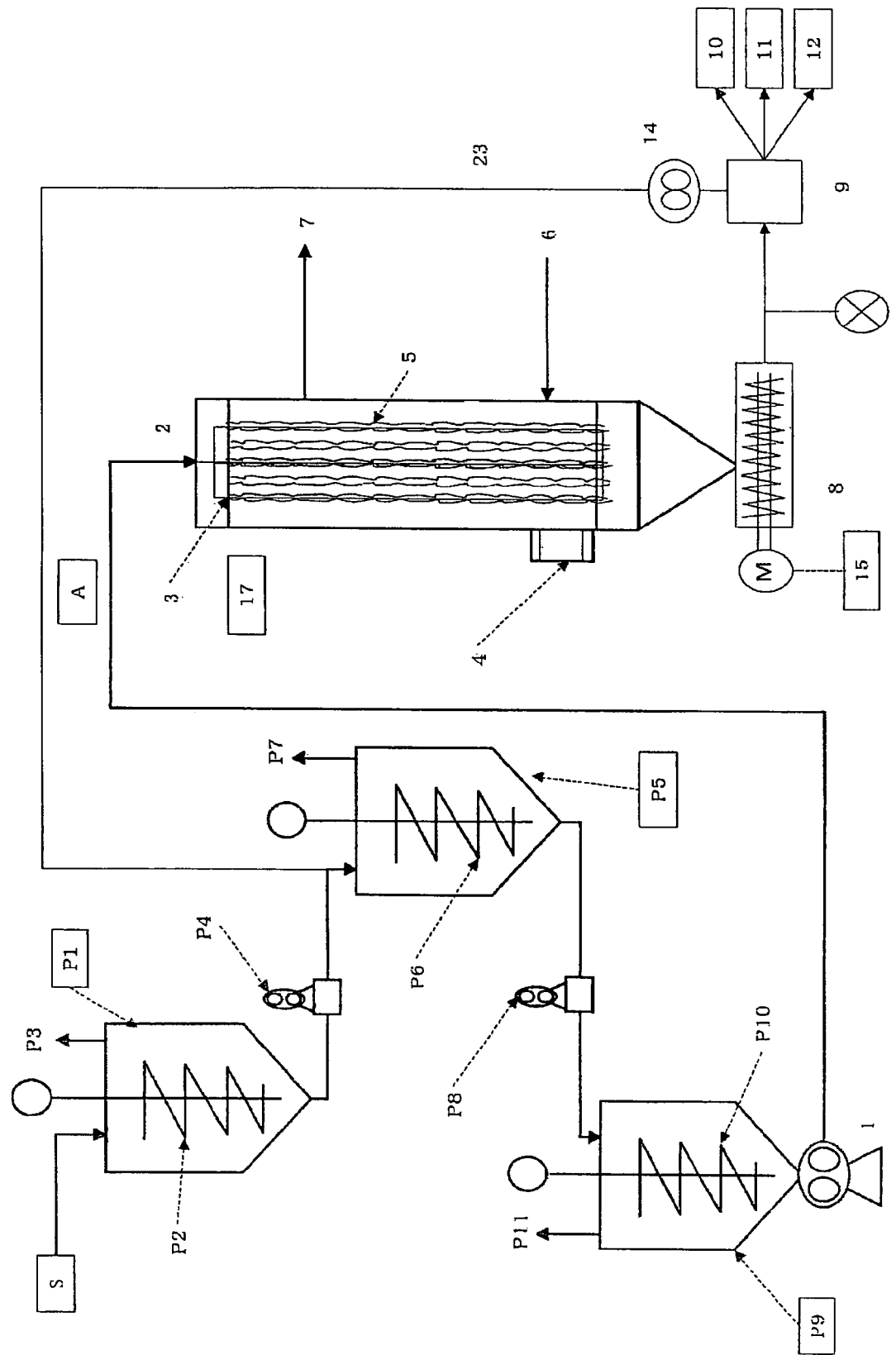
FIG. 9 A schematic drawing showing an example of the polymerization reactor and molding apparatus used in the present invention.
Figure 10:
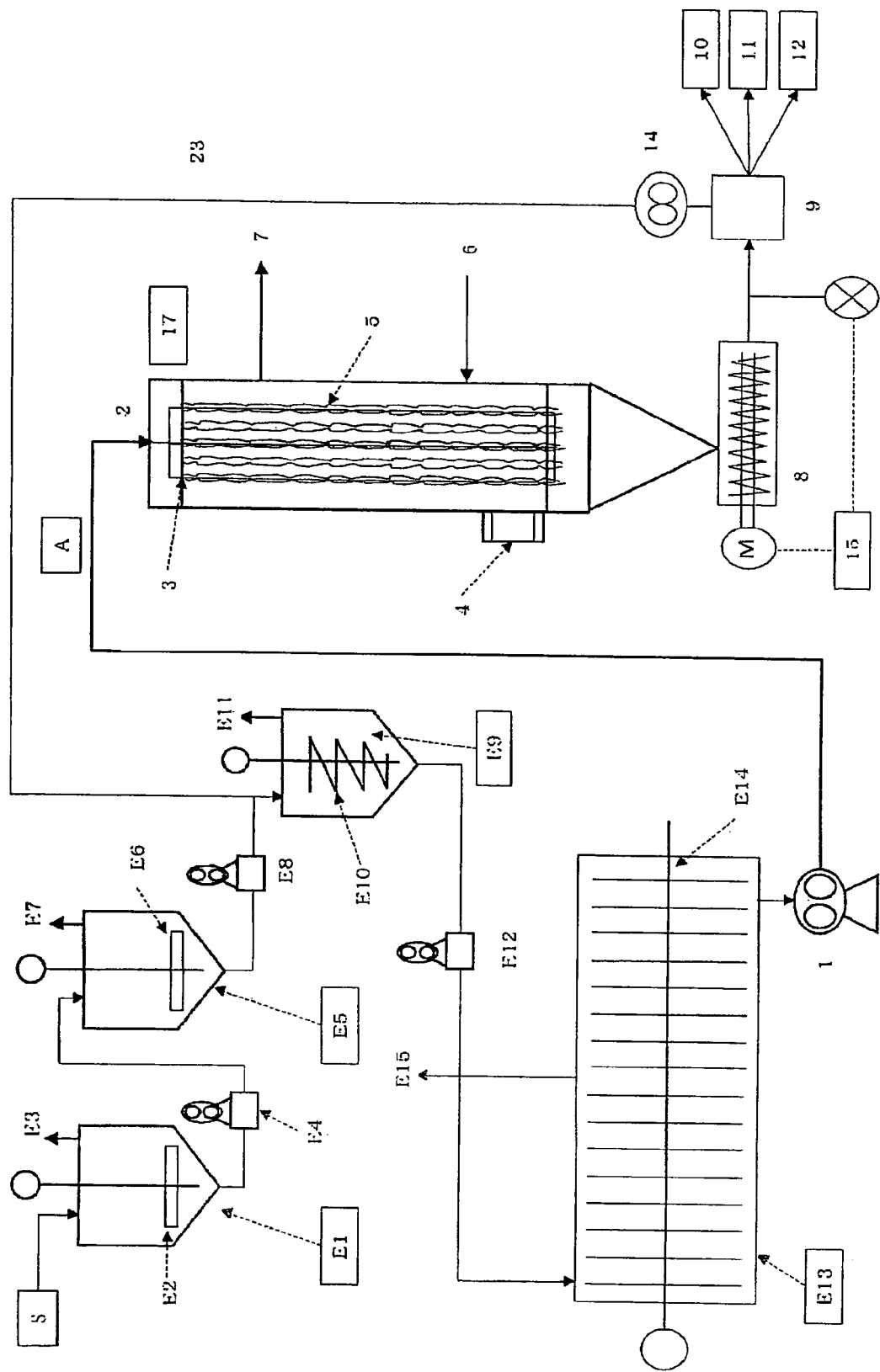
FIG. 10 A schematic drawing showing an example of the polymerization reactor and molding apparatus used in the present invention.
Figure 11:
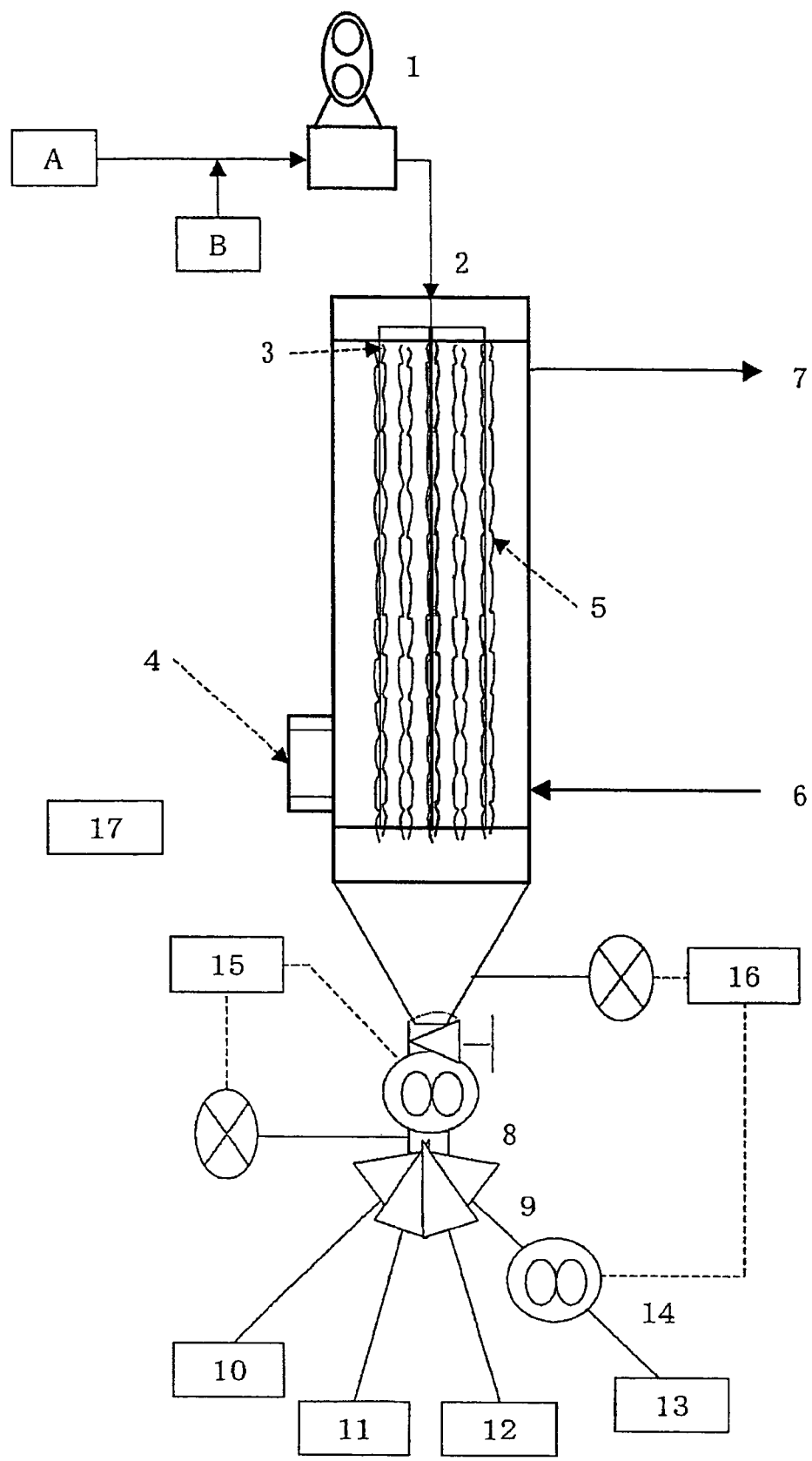
FIG. 11 A schematic drawing showing an example of the polymerization reactor and molding apparatus used in the present invention.

The invention claimed is:

1. A method for producing a molded product consisting of a resin polymerized by a melt polycondensation reaction, comprising continuous feeding of a prepolymer in molten state from a prepolymer feeding port to a polymerization reactor, discharging from holes of a porous plate, followed by producing a resin by polymerization while dropping along a supporting substrate under reduced pressure, discharging said resin from at least one discharge pump, followed by molding by transferring to at least one molding machine in molten state without solidification, wherein a transfer pressure between said polymerization reactor and said molding machine is controlled to maintain said transfer pressure at an arbitrary pressure from 0.1 to 100 MPa (absolute pressure) and within ±80% of set pressure by (I) controlling an output amount of the at least one discharge pump to be 1.0 to 100 times a feed amount of the prepolymer and by (II) returning a resin discharged from the at least one discharge pump to a bottom of said polymerization reactor, using a pipeline connected to a downstream side of the at least one discharge pump and connected to the bottom of said polymerization reactor, using a system for output pressure detection, and controlling an opening degree of a polymer return valve or a back pressure valve installed at said pipeline, said resin is discharged so that a polymer melt residence time at the bottom of said polymerization reactor is controlled from 0.1 to 120 minutes, by transferring said resin to a pelletizer and/or discharge nozzle by installing a transfer pump connected to the pelletizer and/or the discharge nozzle in addition to a molding machine at the bottom of said polymerization reactor or after the at least one discharge pump, and the inlet of the pipeline is positioned downstream from the supporting substrate.

2. A method for producing a molded product according to claim 1, further comprising discharging said resin from at least two discharge pumps, followed by the molding, wherein at least one molding machine and/or pelletizer are connected to each of the discharge pumps.

3. A method for producing a molded product according to claim 2, wherein at least a part of a polycondensation polymer produced by said melt polycondensation reaction in the amount over the amount to be used in molding or pelletizing is returned for re-circulation to an arbitrary step among production steps for said polycondensation polymer.

4. A method for producing a molded product according to claim 1, wherein said prepolymer is reacted with a molecular weight regulator of an arbitrary amount in an arbitrary step before feeding to said polymerization reactor.

5. A method for producing a molded product according claim 1, wherein said molded product is at least one kind selected from preform for bottle molding, films, sheets, containers and fibers.

6. A method for producing a molded product according to claim 1, wherein a resin polymerized by said melt polycondensation reaction is a polyester resin.

7. A method for producing a molded product according to claim 1, wherein the at least one discharge pump is connected to a distributor which is connected to the polymerization reactor, and there is no pump between the distributor and the polymerization reactor.

8. A method for producing a molded product according to claim 1, wherein there is a connection between the polymerization reactor and a distributor and the at least one discharge pump is the only pump of the connection.

9. A method for producing a molded product according to claim 1, wherein prepolymer is continuously fed to the polymerization reactor, the molding machine requires an intermittent supply of molten resin, the supply of molten resin to the molding machine is monitored such that when the molding machine is not being supplied with molten resin, the molten resin is recirculated back to the polymerization reactor, and the polymer melt residence time at the bottom of the polymerization reactor is varied according to whether the molten resin is being supplied to the molding machine or being recirculated back to the polymerization reactor.

10. A method for producing a molded product according to claim 1, wherein the transfer pressure between the polymerization reactor and each molding machine is maintained within ±80% of a set pressure even though the polymerization reactor continuously produces the resin and each molding machine intermittently consumes the resin.

11. A method for producing a molded product from a resin polymerized by a melt polycondensation reaction, comprising continuous feeding of a prepolymer in molten state from a prepolymer feeding port to a polymerization reactor, discharging from holes of a porous plate, followed by producing a resin by polymerization while dropping along a supporting substrate under reduced pressure, discharging said resin from at least one discharge pump, followed by molding by transferring to at least one molding machine in molten state without solidification, wherein a transfer pressure between said polymerization reactor and said molding machine is controlled to maintain said transfer pressure at an arbitrary pressure from 0.1 to 100 MPa (absolute pressure) and within ±80% of set pressure by (I) controlling an output amount of the at least one discharge pump to be 1.0 to 100 times a feed amount of the prepolymer and by (II) returning a resin discharged from the discharge pump to a bottom of said polymerization reactor, using a pipeline connected to a downstream side of the at least one discharge pump and connected to the bottom of said polymerization reactor downstream from the prepolymer feeding port, said resin is discharged so that a polymer melt residence time at the bottom of said polymerization reactor is controlled from 0.1 to 120 minutes, and the inlet of the pipeline is positioned downstream from the supporting substrate.

* * * * *